(12) United States Patent
Sant et al.

(10) Patent No.: US 11,951,682 B2
(45) Date of Patent: Apr. 9, 2024

(54) THERMORESPONSIVE SUSPENSION COMPOSITES FOR 3D PRINTING

(71) Applicants: The Regents of the University of California, Oakland, CA (US); Technical University of Munich, Munich (DE); Master Builders Solutions Admixtures US, LLC, Beachwood, OH (US)

(72) Inventors: Gaurav Sant, Los Angeles, CA (US); Sharu Bhagavathi Kandy, Los Angeles, CA (US); Torben Gädt, Traunstein (DE); Iman Mehdipour, Los Angeles, CA (US); Thiyagarajan Ranganathan, Los Angeles, CA (US); Samanvaya Srivastava, Los Angeles, CA (US); Paul Seiler, Aurora, OH (US)

(73) Assignees: The Regents of the University of California, Oakland, CA (US); Technical University of Munich, Munich (DE); Master Builders Solutions Admixtures US, LLC, Beachwood, OH (US)

( * ) Notice: Subject to any disclaimer, the term of this patent is extended or adjusted under 35 U.S.C. 154(b) by 71 days.

(21) Appl. No.: 17/529,763

(22) Filed: Nov. 18, 2021

(65) Prior Publication Data

US 2023/0150192 A1    May 18, 2023

(51) Int. Cl.
*B29C 64/00* (2017.01)
*B29C 64/165* (2017.01)
*B33Y 10/00* (2015.01)
*B33Y 70/00* (2020.01)
*B33Y 80/00* (2015.01)
*C08G 59/24* (2006.01)
*C08G 59/40* (2006.01)
*C08L 63/00* (2006.01)

(52) U.S. Cl.
CPC ............ *B29C 64/165* (2017.08); *B33Y 10/00* (2014.12); *B33Y 70/00* (2014.12); *B33Y 80/00* (2014.12); *C08G 59/245* (2013.01); *C08G 59/4064* (2013.01); *C08L 63/00* (2013.01); *C08L 2201/54* (2013.01)

(58) Field of Classification Search
CPC .............................. B29C 64/165; B33Y 10/00
See application file for complete search history.

(56) References Cited

U.S. PATENT DOCUMENTS

| | | | | |
|---|---|---|---|---|
| 2001/0009133 A1* | 7/2001 | Chatterji | ............... | C04B 24/281 106/724 |
| 2005/0032938 A1* | 2/2005 | Flint | ...................... | C08G 59/66 528/109 |
| 2014/0303286 A1* | 10/2014 | Li | ........................... | C08L 63/00 523/439 |

* cited by examiner

*Primary Examiner* — Nicholas R Krasnow
(74) *Attorney, Agent, or Firm* — Foley Hoag LLP; David P. Halstead; Alexander J. Chatterley

(57) ABSTRACT

A thermoresponsive suspension composition for use in additive manufacturing includes an aqueous suspension of a thermosetting resin, a crosslinking agent configured to react with the thermosetting resin, and a mineral particulate, wherein the thermosetting resin and crosslinking agent react at or above a trigger temperature.

19 Claims, 28 Drawing Sheets

FIG. 2

| $r$ (-) | $T_{onset}$ (°C) (Peak 1) | $T_{peak}$ (°C) (Peak 1) | $\Delta h_{total}$ (J/g) (Peak 1 + Peak 2) | Epoxy/thiol contribution | $T_g$ (°C) | $T_{10\%}$ (°C) |
|---|---|---|---|---|---|---|
| 0.50 | 65.8 | 75.6 | 207.4 | 0.41 | 56.4 | 335.8 |
| 0.75 | 66.9 | 78.1 | 202.1 | 0.61 | 39.1 | |
| 1.00 | 67.6 | 81.3 | 201.4 | 0.77 | 25.1 | |
| 1.40 | 66.7 | 81.2 | 198.9 | 0.97 | 13.4 | |
| 1.50 | 65.9 | 81.1 | 193.1 | 0.99 | 13.4 | 316.2 |

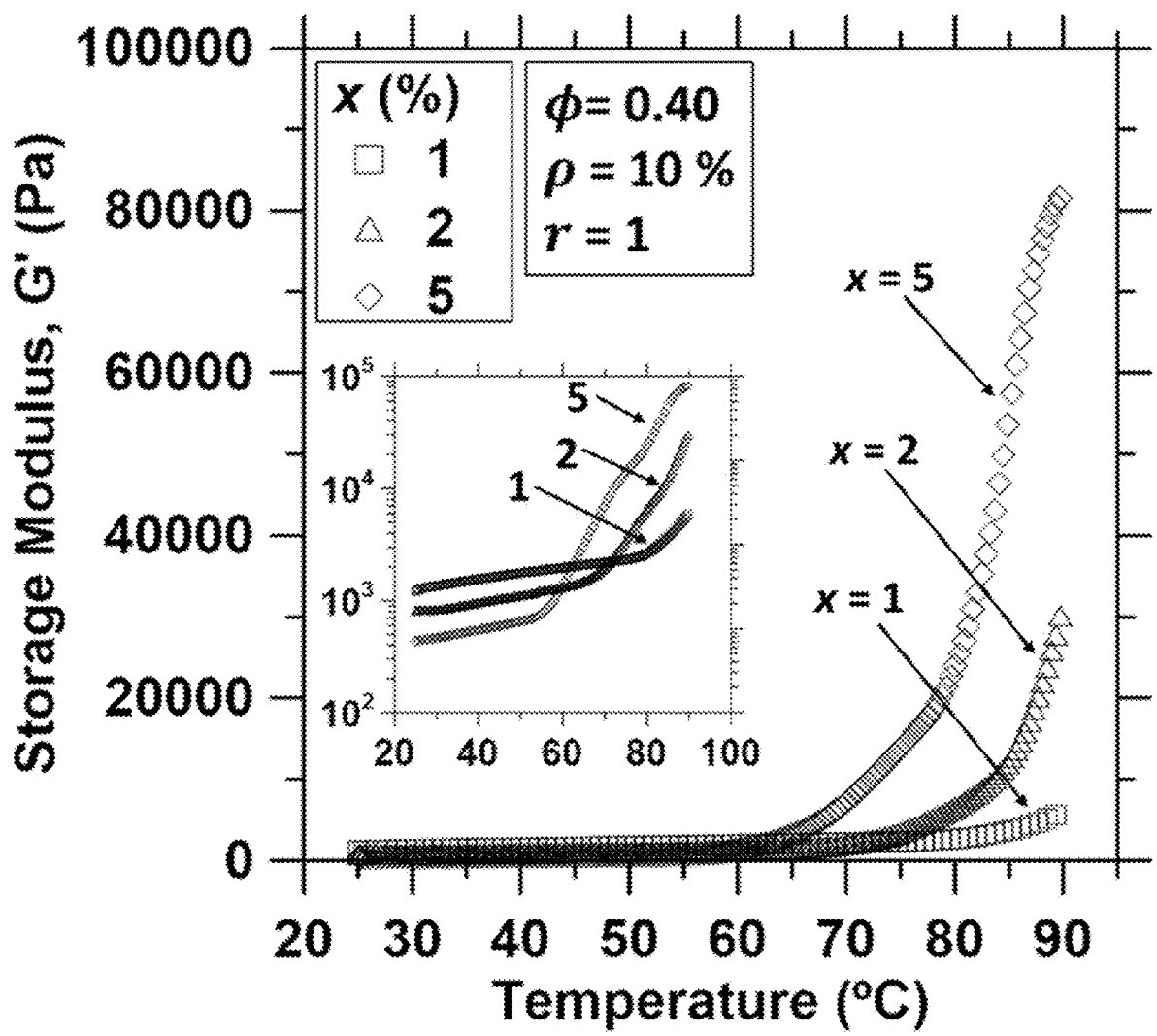

FIG. 8 (CONTD.)
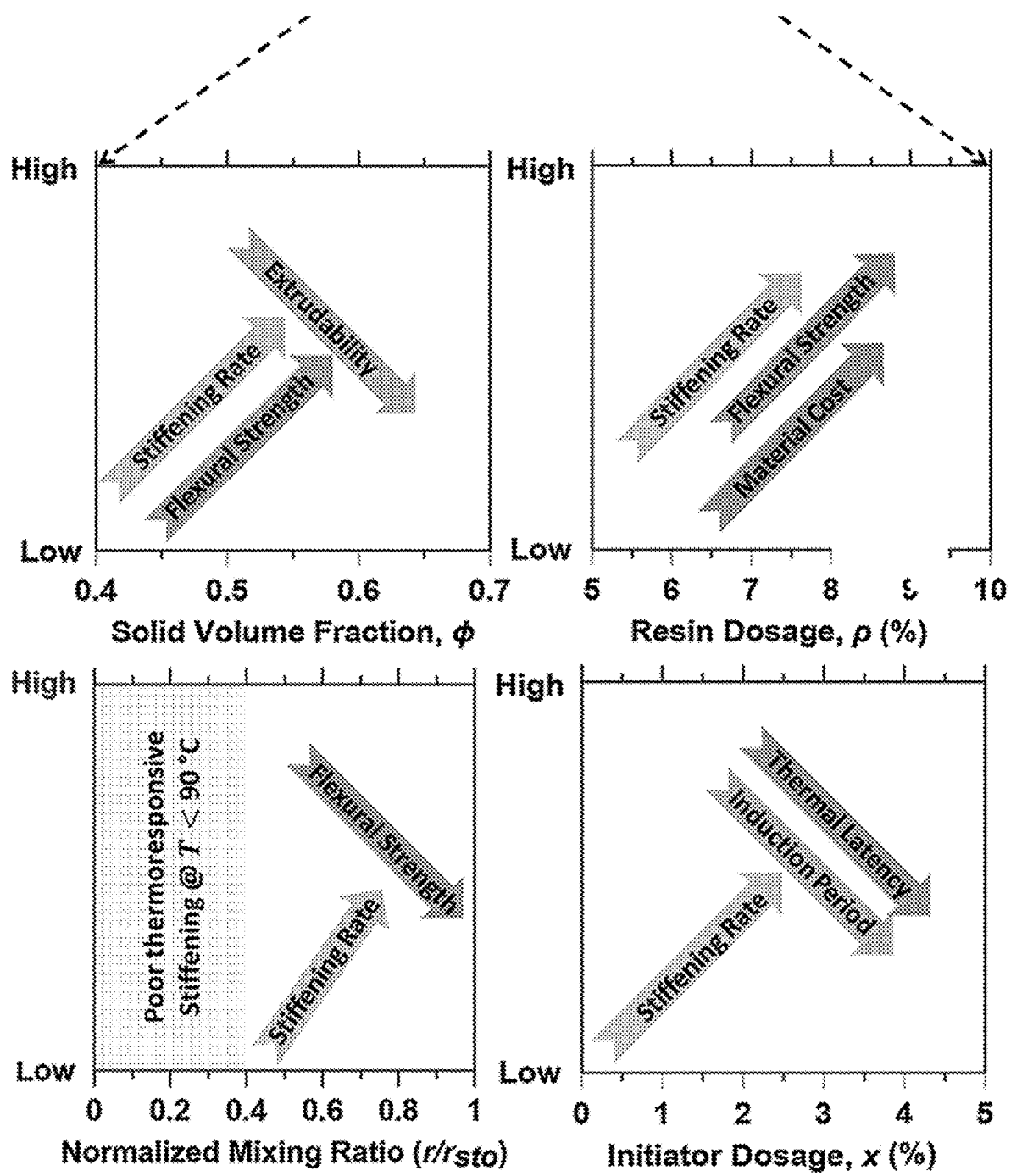

| Resin Dosage ρ (w%) | SEM Micrographs |
|---|---|
| 5 |  |
| 7.5 |  |
| 10 |  |

| Resin Dosage ρ (w%) | Estimated dispersion of polymer |
|---|---|
| 5 |  |
| 7.5 |  |
| 10 |  |

THERMORESPONSIVE SUSPENSION COMPOSITES FOR 3D PRINTING

STATEMENT OF GOVERNMENT SUPPORT

This invention was made with government support under Designing Materials to Revolutionize and Engineer our Future (DMREF) Award Number 1922167, awarded by the National Science Foundation. The government has certain rights in the invention.

TECHNICAL FIELD

The present technology relates generally to thermoresponsive suspension compositions for use in additive manufacturing. The thermoresponsive suspension compositions may be used in a method of producing a three dimensional (3D) object via extrusion-based additive manufacturing processes.

SUMMARY

In one aspect, disclosed herein is a thermoresponsive suspension composition for use in additive manufacturing, the composition comprising an aqueous suspension of a thermosetting resin, a crosslinking agent configured to react with the thermosetting resin, and a mineral particulate, wherein the thermosetting resin and crosslinking agent react at or above a trigger temperature.

In some embodiments, the mineral particulate is a mineral particulate common to cementitious compositions. In some embodiments, the mineral particulate comprises quartz, calcite, portlandite, Portland cement, gypsum, calcium aluminate cement, calcium sulfoaluminate cement, fly ash, ground granulated blast furnace slag, calcined clay, limestone, recycled concrete, or a mixture of any two or more thereof.

In some embodiments, the thermosetting resin comprises an epoxy resin, a polyisocyanate resin, an acrylic resin, or a mixture of any two or more thereof. In some embodiments, the thermosetting resin comprises an epoxy resin and the epoxy resin comprises at least two epoxy functional groups. In some embodiments, the thermosetting resin comprises from about 1% to about 50% by mass of the mineral particulate of the composition, preferably about 5% to about 10%.

In some embodiments, the crosslinking agent comprises a thiol-containing molecule, an amine-containing molecule, an alcohol-containing molecule, or a mixture of any two or more thereof. In some embodiments, the crosslinking agent comprises a thiol-containing molecule that is a thiol-terminated polymer having one or more thiol groups. In some embodiments, a mass ratio of crosslinking agent to thermosetting resin is about 0.5 to 2, preferably about 0.75 to 1.5.

In some embodiments, the composition exhibits a solid mass fraction from 0.50 to 0.85.

In some embodiments, the thermoresponsive suspension composition further comprises a dispersing agent.

In some embodiments, the dispersing agent comprises a comb copolymer comprising a polyethylene glycol moiety and a charge bearing moiety, polysulfonate or related composition, or a mixture thereof, optionally wherein the comb copolymer comprising polyethylene glycol moiety and a charge bearing moiety is a polycarboxylate ether. In some embodiments, the dispersing agent is present from about 0.1% to about 5% dry mass of dispersant by mass of the mineral particulate, preferably from about 0.25% to about 0.75%.

In some embodiments, the thermoresponsive suspension composition further comprises a cross-linking initiator. In some embodiments, the cross-linking initiator is a nucleophilic initiator with low basicity. In some embodiments, the cross-linking initiator comprises 1-methylimidazole, benzyldimethylamine, or a mixture thereof. In some embodiments, the cross-linking initiator is present at about 0.5% to about 10% mass of initiator by dry mass of resin, preferably from about 1% to about 5%.

In some embodiments, the trigger temperature of the thermoresponsive suspension composition is from about 30° C. to about 90° C. In some embodiments, at or above the trigger temperature, the thermoresponsive suspension composition exhibits stiffening rate of about 5 Pa/s to about 500 kPa/s.

In some embodiments, the thermoresponsive suspension composition exhibits a pH from about 4 to about 13, preferably from about 4 to about 9.

In another aspect, disclosed herein is a method of producing a three dimensional (3D) object by an extrusion-based additive manufacturing process, the method comprising:
  introducing a thermoresponsive suspension composition to a nozzle of an extrusion-based 3D printing system; extruding the thermoresponsive suspension composition out of the nozzle onto a substrate; and moving the extrusion nozzle and/or the substrate to form the 3D object having a predetermined shape resolution; wherein: the thermoresponsive suspension composition comprises an aqueous suspension of a thermosetting resin, a crosslinking agent configured to react with the thermosetting resin, and a mineral particulate, wherein the thermosetting resin and crosslinking agent react at or above a trigger temperature; and the nozzle is maintained at a temperature at or above the trigger temperature.

In some embodiments, the method further comprises subjecting the 3D object to post-curing treatment for further strength gain, wherein the post-curing treatment includes subjecting the 3D object to a temperature from about 50° C. to about 90° C., and/or a relative humidity from about 50% to about 95%, for about 24 hours to about 72 hours.

In some embodiments, thermoresponsive suspension composition exhibits a thermoresponsive stiffening rate and flexural strength of the 3D object at a specified solid volume fraction, and increasing the solid volume fraction, thermosetting resin content, or both of the thermoresponsive suspension composition increases the thermoresponsive stiffening rate of the thermoresponsive suspension composition and/or the flexural strength of the 3D object.

In some embodiments, the thermoresponsive suspension composition further comprises an initiator. In some embodiments, increasing the amount of initiator decreases the trigger temperature of the reaction of the thermosetting resin and crosslinking agent. In some embodiments, increasing the amount of initiator increases a rate of stiffening of the thermoresponsive suspension composition.

In some embodiments, decreasing a mass ratio of crosslinking agent to thermosetting resin increases the flexural strength of the 3D object.

BRIEF DESCRIPTION OF THE FIGURES

FIG. 2 shows thermal analyses of epoxy-thiol resin mixture formulations with different thiol-to-epoxy mass ratios, r and fixed initiator dosage (x=1% by mass of resin) collected at a temperature ramp of 10° C./min. Here, the epoxy-thiol curing onset temperature ($T_{onset}$), maximum peak temperature ($T_{peak}$), total heat of reaction ($\Delta h_{total}$), epoxy thiol contribution (i.e., $\Delta h_{peak1}/\Delta h_{total}$) were estimated using freshly prepared mixtures. The glass 1 transition temperature ($T_g$) and the temperature of 10% mass loss ($T_{10\%}$) were estimated from samples that were cured at 90° C. for 24 h.

FIG. 7A shows SAOS data illustrating the variation in elastic modulus G' with temperature for different quartz formulations comprising different initiator dosage (with solid volume fraction, $\phi$=0.40, resin dosage, $\rho$=10% by mass of quartz and thiol-to-epoxy mass ratio, r=1).

FIG. 10A shows SEM images of composite cross-section. FIG. 10B shows the distribution of the thermosetting polymer network in the composite estimated through the energy dispersive X-Ray spectroscopy (EDS) elemental mapping by subtracting the pixel areas corresponding to calcium (i.e., corresponding to calcite) from that of carbon (i.e., corresponding to calcite+crosslinked polymer network).

FIG. 12A shows SAOS analysis results illustrating the variation in elastic modulus G' with temperature for different suspensions without resin. FIG. 12B shows G' variations with temperature for suspensions with a resin dosage, $\rho$=10%. FIG. 12C shows evolution of rate of change of G' (i.e., dG'/dt) as a function of temperature for suspensions with $\rho$=10%.

DETAILED DESCRIPTION

Figure 1A:
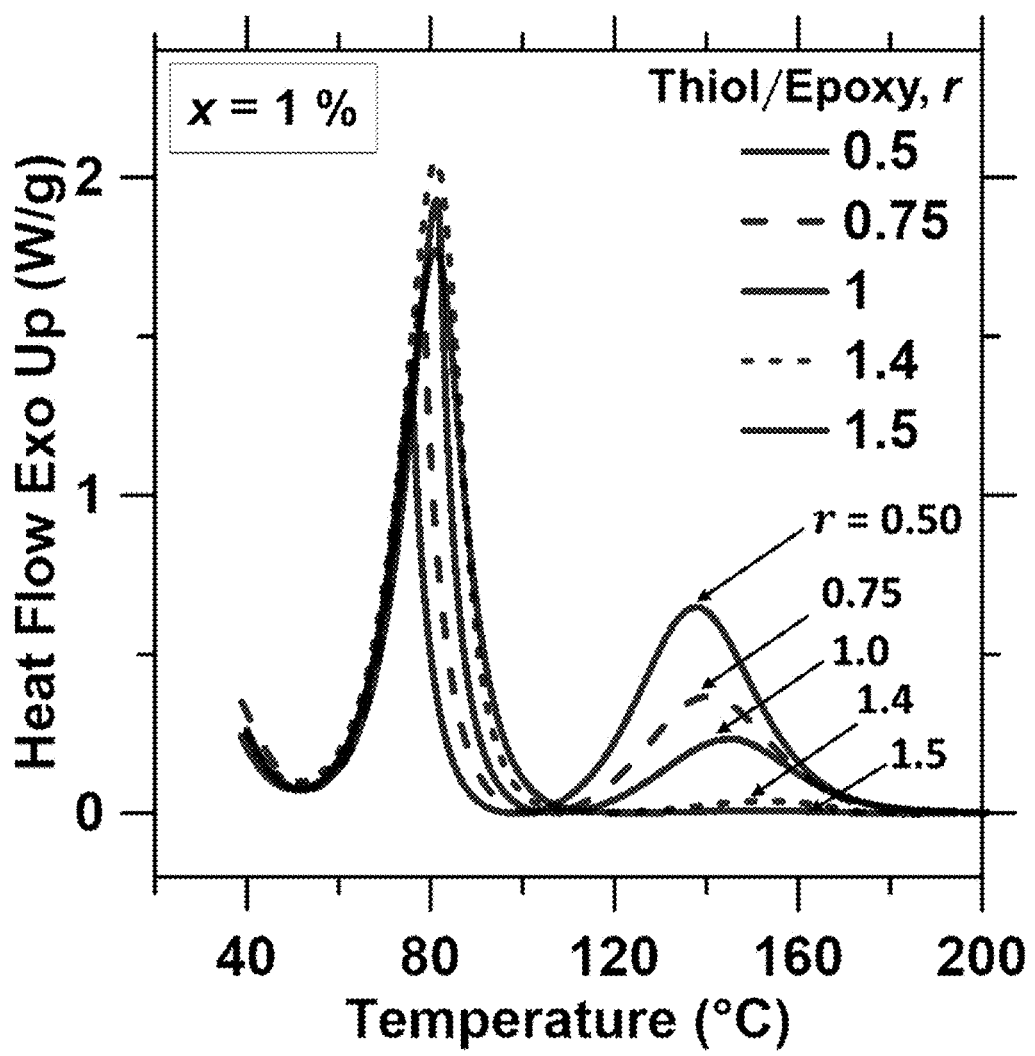
FIGS. 1A-1B show differential scanning calorimetry (DSC) thermogram (FIG. 1A) and calorimetric epoxy cure conversion (a) (FIG. 1B) during the curing of epoxy-thiol resin mixture formulations with different thiol-to-epoxy mass ratios, r, and fixed initiator dosage x=1% by mass of resin.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Unless defined otherwise, all technical and scientific terms used herein generally have the same meaning as commonly understood by one of ordinary skill in the art to which this technology belongs.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, the term "acrylic resin" refers to a polymer typically derived from acrylic acid, methacrylic acid, and other acrylates.

As used herein, the term "epoxy resins," also known as polyepoxides, refers to a class of reactive prepolymers and polymers which contain two or more epoxide groups per polymer. The epoxide functional group may also collectively be referred to as an epoxy. The IUPAC name for an epoxide group is an oxirane. Epoxy resins may be reacted either with themselves through catalytic homopolymerisation, or with a wide range of crosslinking agents including but are not limited a thiol-containing molecule, an amine-containing molecule, an alcohol-containing molecule, or a mixture of any two or more thereof.

As used herein, the term "flexural strength," also known as "modulus of rupture," or "bend strength," or "transverse rupture strength" refers to a material property, defined as the stress in a material just before it yields in a flexural test.

As used herein, "polyisocyanate resin" refers to a polymer containing two or more isocyanate group (—NCO). Polyisocyanate resins may react with a compound including but is not limited to a primary alcohol, a secondary alcohol, a tertiary alcohol, a primary aliphatic amine, a secondary aliphatic amine, a primary aromatic amine, urea, urethane, or a combination of any two or more thereof.

As used herein, a "thermosetting resin" refers to a prepolymer in a soft solid or viscous liquid state that changes irreversibly into an infusible, insoluble polymer network by crosslinking reactions or "curing." Curing is a chemical process employed in polymer chemistry and process engineering that produces the toughening or hardening of a polymer material by cross-linking of polymer chains. Curing may be achieved by reacting a thermosetting resin with itself (homopolymerisation) or by forming a copolymer with "a crosslinking agent" configured to react with the thermosetting resin. Curing may be brought on by heat, a catalyst or "initiator", or suitable irradiation. Curing process may be monitored by rheological analysis, thermal analysis, dielectrometric analysis, or spectroscopic analysis (e.g., Fourier-transform infrared spectroscopy (FTIR) and Raman spectroscopy); those methods are well-known in the art. Thermosetting resins tend to have high dimensional stability, high-temperature resistance, and good resistance to solvents because of their three-dimensional cross-linked structure.

As used herein, "trigger temperature," or "stiffening onset temperature $(T_c)$" of a thermoresponsive suspension composition, is estimated as the temperature at which $dG'/dt \geq 10$ Pa/s, as shown in the plot illustrating the variation in elastic modulus G' with temperature, wherein the plot is obtained by small amplitude oscillatory shear (SAOS) analysis with a temperature ramp of 2° C./min.

The present disclosure generally provides thermoresponsive suspension compositions for use in additive manufacturing, where the composition includes an aqueous suspension of a thermosetting resin, a crosslinking agent configured to react with the thermosetting resin, and a mineral particulate, wherein the thermosetting resin and crosslinking agent react at or above a trigger temperature. The thermoresponsive suspensions provide for controllable ultrafast stiffening at adjustable trigger temperatures. These suspensions undergo rapid solidification in a matter of seconds to minutes upon bulk thermal activation. Curing of the suspensions at optimal conditions ensures the crosslinking of the thermoset resins that strengthen the composite. The thermoresponsive suspension compositions can be utilized for extrusion-based 3D-printing to produce overhangs, to print highly stacked layers at a faster rate, and to improve print fidelity. The thermoresponsive suspension compositions provide precise control over the engineered suspension to achieve targeted, pre- and post-curing material properties. The present technology offers a pathway to overcoming the limitations of suspension-based 3D printing based on inorganic binders alone, and expands the design and production space accessible for architected structural construction components.

In one aspect, a thermoresponsive suspension composition is provided for use in additive manufacturing. The composition may include an aqueous suspension of a thermosetting resin, a crosslinking agent that is configured to react with the thermosetting resin, and a mineral particulate, wherein the thermosetting resin and crosslinking agent react at or above a trigger temperature.

The mineral particulate may be a material based upon mineral content that may be common to cementitious compositions. Illustrative examples of mineral particulates include, but are not limited to quartz, calcite, portlandite, Portland cement, gypsum, calcium aluminate cement, calcium sulfoaluminate cement, fly ash, ground granulated blast furnace slag, calcined clay, limestone, recycled concrete, or a mixture of any two or more thereof.

In some embodiments, the thermosetting resin may include an epoxy resin, a polyisocyanate resin, an acrylic resin, or a mixture of any two or more thereof. In some embodiments, the thermosetting resin comprises from about 1% to about 50% by mass of the mineral particulate of the composition. In some embodiments, the thermosetting resin comprises from about 1% to about 5%, about 5% to about 10%, about 10% to about 15%, about 15% to about 20%, about 20% to about 25%, about 25% to about 30%, about 30% to about 35%, about 35% to about 40%, about 40% to about 45%, or about 45% to about 50% by mass of the mineral particulate of the composition. In some embodiment, the thermosetting resin comprises about 5% to about 10% by mass of the mineral particulate of the composition.

The thermosetting resin content may play a role in controlling the fluidity and thermoresponsiveness of the thermoresponsive suspension compositions. Increasing the thermosetting resin content of the thermoresponsive suspension composition may lead to an increase in the thermoresponsive stiffening rate of the suspensions and/or the flexural strength of cured composites. Without being bound to theory, the increase in resin content builds a denser cross-linked polymer network and binds the particle aggregates together quicker, thereby enhancing thermo-stiffening. Stiffening rate may be measured by evaluating the rate of change of elastic modulus G' (i.e., dG'/dt) as a function of the temperature, and the average stiffening rate is estimated as the average value of dG'/dt between $T_c$ and 90° C.

In any of the above embodiments, the crosslinking agent is a molecule configured to react with any of the above thermosetting resins. The crosslinking agent may include but are not limited a thiol-containing molecule, an amine-containing molecule, an alcohol-containing molecule, or a mixture of any two or more thereof. Crosslinking agents for a given thermosetting resin are well-known to a person of ordinary skill in the art.

The thiol-containing (alternatively, mercaptan-containing) molecule may be a thiol-terminated polymer having one or more thiol groups. The thiol groups may be primary thiols, secondary thiols, or a mixture thereof. Examples of a thiol-containing molecule include but are not limited to GABEPRO™ GPM-800 (Gabriel Chemical, The Woodlands, TX), GABEPRO™ GPM-830CB (Gabriel Chemical; a thiol similar to that of GPM-800), trimethylolpropane tris(3-mercaptopropionate) (Sigma Aldrich, St. Louis, MO; a thiol commonly reported in the literature), or any combination of two or more thereof.

The amine-containing molecule may be an amine-terminated polymer having one or more amine groups. The amine groups may be primary amines, secondary amines, or a mixture thereof. In some embodiments, the amine groups may be aliphatic amines, cycloaliphatic amines, aromatic amines, or a combination of any two or more thereof. Examples of the amine-containing molecule include but are not limited to Anquamine 287 (Evonik Corporation, Essen, Germany), Ancamine 1922A (Evonik Corporation), Ancamine 2910 (Evonik Corporation), or a combination of any two or more thereof.

The alcohol-containing molecule may be an alcohol-terminated polymer having one or more alcohol groups. The alcohol groups may be primary alcohols, secondary alcohols, or a mixture thereof. Examples of an alcohol-containing molecule include but are not limited to the Phenolite series (DIC Corporation, Chuo City, Tokyo, Japan).

In some embodiments, the thermoresponsive suspension composition has a mass ratio of the crosslinking agent to the thermosetting resin from about 0.5 to 2, preferably from about 0.75 to 1. In some embodiments, flexural strength of the cured composites increases with decreasing mass ratio of the crosslinking agent to the thermosetting resin.

In some embodiments, the thermosetting resin includes an epoxy resin and the epoxy resin includes at least two epoxy functional groups. Illustrative epoxy resins include bisphenol-based epoxy resins that may be generated by reacting epichlorohydrin (ECH) with a bisphenol. Examples of a bisphenol include but are not limited to Bisphenol A, Bisphenol F, or any derivative thereof. The structure of an epoxy resin based on Bisphenol A is provided herein as a non-limiting illustration:

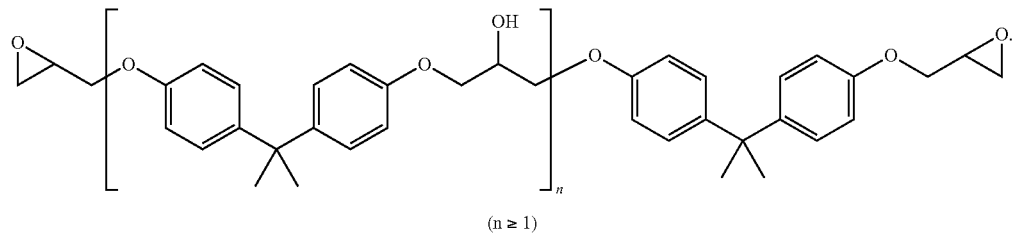

(n ≥ 1)

Other epoxy resins include but are not limited to Novolaks, aliphatic epoxy resins (e.g., epoxidized vegetable oils are formed by epoxidation of unsaturated fatty acids by reaction with peracids), and cycloaliphatic epoxies. The structure of Novolaks is provided herein as a non-limiting illustration:

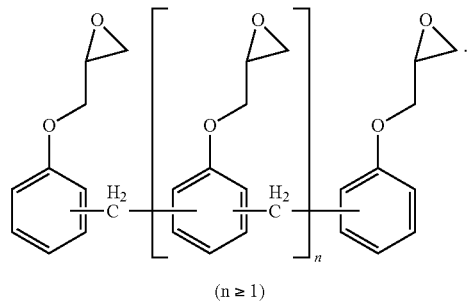

(n ≥ 1)

Examples of epoxy resins include but are not limited to EPI-REZ™ Resin 7510-W 60 (Hexion Chemicals, Columbus, OH), D.E.R™ 917 (Olin Epoxy), Erisys® GE-61 (Huntsman), Erisys® GA-240 (Huntsman), or a combination of any two or more thereof.

Curing of epoxy resin may be achieved by reacting an epoxy resin with itself (homopolymerisation). Homopolymerisation may be achieved in the presence of an anionic catalyst (a Lewis base such as tertiary amines or imidazoles) or a cationic catalyst (a Lewis acid such as a boron trifluoride complex) to form a cured network.

In some embodiments, curing of epoxy resin may be achieved by reacting the epoxy resin with a crosslinking agent. Examples of a crosslinking agent include but are not limited to a thiol-containing molecule, an amine-containing molecule, an alcohol-containing molecule, or a mixture of any two or more thereof.

In some embodiments, the thiol-containing molecule is a thiol-terminated polymer having one or more thiol groups. In some embodiments, curing of epoxy resins in the presence of the thiol-containing molecule may be achieved by adjusting the suspension to high pH (e.g., pH>12). In some embodiments, thermoresponsive suspension composition comprising a mineral particulate with high alkalinity (e.g., portlandite ($Ca(OH)_2$)) may be cured without a catalyst or an initiator.

In some embodiments, curing of an epoxy resin may be achieved by reacting an epoxy resin with itself (homopolymerisation) and a crosslinking agent.

In some embodiments, the thermoresponsive suspension composition exhibits a solid mass fraction from 0.50 to 0.85. In some embodiments, increasing solid mass fraction of the thermoresponsive suspension composition increases thermoresponsive stiffening rate of the suspensions and/or the flexural strength of cured composites.

The thermoresponsive suspension compositions may also include a dispersing agent. Illustrative dispersing agents include, but are not limited to, a comb copolymer comprising a polyethylene glycol moiety and a charge bearing moiety, polysulfonate or related composition, or a mixture thereof, optionally wherein the comb copolymer comprising polyethylene glycol moiety and a charge bearing moiety is a polycarboxylate ether. In some embodiments, the dispersing agent may be present from about 0.1% to about 5% dry mass of dispersant by mass of the mineral particulate, preferably from about 0.25% to about 0.75%.

The thermoresponsive suspension compositions may further include a cross-linking initiator. In some embodiments, the cross-linking initiator is a nucleophilic initiator. The nucleophilic initiator may include one or more of covalent or ionic metal amides, alkoxides, hydroxides, cyanides, phosphines, amines and organometallic compounds (e.g., alkyl-lithium compounds and Grignard reagents). In some embodiments, nucleophilic initiator exhibits low basicity. In some embodiments, the cross-linking initiator may include 1-methylimidazole, benzyldimethylamine, triethylamine, 1,8-diazabicyclo(5.4.0)undec-7-ene, lithium hydroxide, or a mixture thereof. In some embodiments, the cross-linking initiator is present from about 0.5% to about 10% mass of initiator by dry mass of resin, preferably from about 1% to about 5%. In some embodiments, increasing initiator dosage decreases induction period and trigger temperature, and increases stiffening rate.

The thermoresponsive suspension compositions may exhibit a trigger temperature from about 30° C. to about 90° C. In some embodiments, the thermoresponsive suspension composition exhibits a trigger temperature from about 30° C. to about 40° C., about 40° C. to about 50° C., about 50° C. to about 60° C., about 60° C. to about 70° C., about 70° C. to about 80° C., or about 80° C. to about 90° C.

In some embodiments, the thermoresponsive suspension composition exhibits a stiffening rate of about 5 Pa/s to about 500 kPa/s. In some embodiments, the thermoresponsive suspension composition exhibits a stiffening rate of about 5 Pa/s to about 10 kPa/s, about 10 Pa/s to about 20 kPa/s, about 20 Pa/s to about 40 kPa/s, about 40 Pa/s to about 60 kPa/s, about 60 Pa/s to about 80 kPa/s, about 80 Pa/s to about 100 kPa/s, about 100 Pa/s to about 120 kPa/s, about 120 Pa/s to about 140 kPa/s, about 140 Pa/s to about 160 kPa/s, about 160 Pa/s to about 180 kPa/s, about 180 Pa/s to about 200 kPa/s, about 200 Pa/s to about 220 kPa/s, about 220 Pa/s to about 240 kPa/s, about 240 Pa/s to about 260 kPa/s, about 260 Pa/s to about 280 kPa/s, about 280 Pa/s to about 300 kPa/s, about 300 Pa/s 320 kPa/s, about 320 Pa/s to about 340 kPa/s, about 340 Pa/s to about 360 kPa/s, about 360 Pa/s to about 380 kPa/s, about 380 Pa/s to about 400 kPa/s, about 400 Pa/s to 420 kPa/s, about 420 Pa/s to about 440 kPa/s, about 440 Pa/s to about 460 kPa/s, about 460 Pa/s to about 480 kPa/s, or about 480 Pa/s to about 500 kPa/s.

In some embodiments, the thermoresponsive suspension composition exhibits a pH from about 4 to about 5, about 5 to about 6, about 6 to about 7, about 7 to about 8, about 8 to about 9, about 9 to about 10, about 10 to about 11, about 11 to about 12, about 12 to about 13, or above 13. In some embodiments, the thermoresponsive suspension compositions exhibit a pH from about 4 to about 9.

In another aspect, a method of producing a three dimensional (3D) object via extrusion-based additive manufacturing process is provided. The method may include introducing a thermoresponsive suspension composition to a nozzle of an extrusion-based 3D printing system; extruding the thermoresponsive suspension composition out of the nozzle onto a substrate; and moving the extrusion nozzle and/or the substrate to form a 3D object having a predetermined shape resolution. In such methods, the thermoresponsive suspension composition may include an aqueous suspension of a thermosetting resin, a crosslinking agent configured to react with the thermosetting resin, and a mineral particulate, where the thermosetting resin and crosslinking agent react at or above a trigger temperature. In the methods, the nozzle may be maintained at a temperature at or above the trigger temperature. In some embodiments, controlled heating is applied in the print nozzle to achieve rapid stiffening of the thermoresponsive suspension composition during extrusion.

In some embodiments, the methods may also include subjecting the 3D object to post-curing treatment for further strength gain. In some embodiments, the post-curing treatment includes subjecting the 3D object to a temperature from about 50° C. to about 90° C., and/or a relative humidity from about 50% to about 95%, for about 24 hours to about 72 hours.

In some embodiments, the thermoresponsive suspension composition exhibits a thermoresponsive stiffening rate and flexural strength of the 3D object at a specified solid volume fraction, and increasing the solid volume fraction, thermosetting resin content, or both of the thermoresponsive suspension composition increases the thermoresponsive stiffening rate of the thermoresponsive suspension composition and/or the flexural strength of the 3D object.

In some embodiments, the thermoresponsive suspension composition may further include a cross-linking initiator, where increasing initiator dosage decreases the induction period and trigger temperature, and/or increases the stiffening rate of the thermoresponsive suspension composition.

In some embodiments, decreasing mass ratio of crosslinking agent to thermosetting resin increases the flexural strength of the formed 3D object.

The present disclosure, thus generally described, will be understood more readily by reference to the following examples, which are provided by way of illustration and are not intended to be limiting of the present invention.

EXAMPLES

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Example 1: Materials and Methods

Materials. Waterborne epoxy resin EPI-REZ 7510-W 60 was obtained from Hexion Chemicals (equivalent weight: 197 g/eq, density at 25° C.: 1100 kg m$^{-3}$). EPI-REZ 7510-W 60 is a nonionic, aqueous dispersion of bisphenol A epoxy resin particles (1-2.2 μm) comprising ~61 mass % solids. GABEPRO GPM-800, a mercaptan-terminated liquid cross-linking agent (thiol equivalent value: 250-333 g/eq, density 1150 kg m$^{-3}$) was obtained from Gabriel Chemicals. The nucleophilic initiator 1-methylimidazole (MI) was obtained from ACROS Organics. Two different polydisperse mineral particulates were used to prepare the thermosensitive suspensions including commercially available quartz ($\alpha$-SiO$_2$, MINUSIL 5, U.S. Silica, density=2650 kg m$^{-3}$) and limestone (CaCO$_3$: calcite: OMYACARB UF-FL, Omya inc., density=2710 kg m$^{-3}$). All chemicals were used as received.

The particle size distributions of the particulates were measured on dilute suspensions of particles (0.002 vol. %) in deionized water using static light scattering (SLS; Partica LA-960A2, Horiba). The median particle diameter ($d_{50}$) of the quartz was 1.95 μm±0.005 μm and for the calcite particles, $d_{50}$=2.01 μm±0.01 μm. The uncertainty represents the standard deviation based on three replicate measurements. A commercially available polycarboxylate ether-based dispersant (MasterGlenium 7500, Master Builders Construction Chemicals) was dosed at 0.5% (dry mass of dispersant) by mass of mineral particulates to disperse the hydrophobic thiol crosslinking agent in water and improve particulate dispersion in the suspension.

Sample preparation. Resin mixtures with different thiol-to-epoxy mass ratios, r ranging between 0.50 to 1.5, and initiator proportion, x varying from 1% to 5% (ratio of mass of initiator to dry mass epoxy resin) were prepared. The mixtures were stirred until a homogeneous-milky dispersion was obtained and tested immediately to study the curing behavior. Thermoresponsive epoxy-thiol-mineral particulate suspensions comprising one or more mineral particulates were prepared at varying solid volume fractions (φ) ranging between 0.30 and 0.60 in a multistep procedure. First, the polymeric dispersant was added to deionized water, followed by the required amount of thiol crosslinking agent, calculated as per the mixing ratio, r. The mixture was then stirred thoroughly using a four-blade impeller-type mixer (RW 20 Digital, IKA) at 500 rpm to disperse the thiol in water. The epoxy resin and the required proportion of the initiator were then added to the dispersion and stirred using the mixer to produce a homogeneous dispersion. Subsequently, varying amounts of mineral particulates were added to the epoxy-thiol dispersion and the mixture was stirred for 300 s using the mixer. In addition, cuboidal "beam" geometries were prepared using the thermoresponsive suspensions for the mechanical strength testing by casting in a rectangular mold followed by curing at 90° C. for 24 h.

Differential scanning calorimetry. A differential scanning calorimeter TA Instruments DSC25 was used to study the curing kinetics of the thermoresponsive formulations. Since the epoxy-thiol resin mixture and suspensions contain water, the water evaporation endotherm masked the exothermic peaks associated with the thermoset curing in the DSC data. Hence, DSC analyses were carried out in high pressure capsules that can withstand pressures up to 10 MPa to separate the overlapping thermal events by delaying the evaporation of water. Any effect of the build-up pressure on the curing kinetics was assumed to be marginal. Approximately 20 mg of sample was placed in the high-pressure capsule and cured using different heating rates between a low temperature of 35° C. to a high temperature of 220° C. in an inert-N$_2$ atmosphere. The exothermic heat of reaction, $\Delta h_{total}$ (i.e., the enthalpy of reaction) was calculated by integration of the calorimetric signal. The cure conversion α (i.e., the calorimetric degree of curing) was estimated as $\alpha=\Delta h/\Delta h_{total}$, where Δh is the reaction heat released up to a temperature T. The non-isothermal cure curves at 2, 5, 10, 15, and 20° C./min, were used to analyze the curing kinetics and estimate the activation energy, $E_a$ as a function of the cure conversion, a using the model-free integral isoconversional method.[5]

Rheology. Thermal latency and the stiffening response of the thermoresponsive suspensions were assessed by rheology measurements on freshly prepared suspensions using a combined motor-transducer rheometer (Discovery HR-2, TA Instruments). The rheometer was equipped with a Peltier concentric cylinder jacket for temperature control and a solvent trap to minimize the water evaporation. A four-bladed vane in cup geometry was used to perform small amplitude oscillatory shear (SAOS) analyses. The suspensions were subjected to a small amplitude oscillatory temperature ramp with a steady temperature increase from 25° C. to 90° C. The thermoresponsive solidification behavior of the suspensions was monitored by the evolution of their elastic modulus G' with temperature. To ensure a uniform temperature and to minimize the thermal lag, temperature ramp measurements were performed at a ramp rate of 2° C./min.

Before temperature ramping, all suspensions were pre-sheared at 100 s$^{-1}$ for 60 s and then relaxed for 60 s to homogenize the suspension and to eliminate shear history effects. The water content of the suspensions was assessed before and after the rheology measurements using thermogravimetric analysis (TGA: STA 6000, Perkin Elmer) and showed an average change of ≤2 and ≤5% by mass, respectively, for suspensions with and without incorporating thermoset resins. Thus, the impact of water evaporation was assumed to be minimal. Thermal latency was assessed using the oscillatory shear rheology at a controlled temperature of 25° C. and the temporal evolution of G' was monitored for a period of up to 2 h. The oscillatory rheology measurements were performed at a fixed angular frequency of 6.283 rad/s and the strain was fixed at 0.5%.

Flexural strength. The flexural strength of the cured composites was evaluated in 3-point bending using an Instron 5564 Universal Material Testing machine equipped with a 1 kN load cell. At least six beam samples were tested for each formulation. The testing was carried out on 50 mm (length)×7 mm (width)×4 mm (thickness) samples at a constant displacement rate of 0.5 mm/min with a span length of 20 mm until fracture. The load-displacement curves were recorded, and the flexural stress was evaluated as $\sigma_f=3Fl/2bd^2$, where F is the failure load, l is the span length, b is the beam width, and d is the beam thickness. The span length-to-depth ratio (l/d) used for the flexural testing was 5 as opposed to the 13.33 prescribed in ASTM C1161. The smaller l/d can produce wedging stresses (i.e., the local stresses under the loading point) that modify the stress distribution on the opposite surface (the tensile side) and cause an increase in the force required to produce a given level of thin-beam flexural stress.[6] The wedging stress may cause the test samples to appear stronger than estimated by Example 2: Controlling Thermal Latency and the Degree of Curing of Epoxy-Thiol Mixtures The curing kinetics of epoxy-thiol resin mixtures without mineral particulates was assessed to optimize the thiol-to-epoxy mixing ratio r and the initiator dosage x. FIG. 1A shows DSC thermograms for epoxy-thiol resin mixtures with different r (at constant initiator dosage x=1% by mass of resin). These thermograms depict the 1-methylimidazole (MI) catalyzed epoxy-thiol curing reaction as comprising two processes: a sharp exotherm representing a fast curing reaction occurring at low temperatures and a second broader exotherm indicating slower curing taking place at higher temperatures.[8] The first curing exotherm corresponds to MI-catalyzed epoxy-thiol curing and the sharp peak form suggests that rapid curing occurs at low temperature.[8,9] The second peak at higher temperatures corresponds to MI-catalyzed anionic homopolymerization of the excess epoxy groups in formulations with a deficit of thiol groups.[8,10]

The relative contributions of the first and the second curing processes depend on the thiol-epoxy mass ratios, r (FIG. 1A). FIG. 2 lists the different curing and thermal characteristics of the epoxy-thiol mixtures with different r measured at 10° C./min. The contribution of the epoxy-thiol reaction to the overall reaction heat, $\Delta h_{Total}$ is ~0.99 for r=1.5. This represents a near-stoichiometric mixture achieving nearly complete epoxy cure conversion $\alpha$ after the thiol-epoxy reaction (note: the theoretical value of r, based on the thiol and epoxy equivalent mass values, lies in the range between 1.3 and 1.7). In all the formulations with r less than the stoichiometric ratio (i.e., r<1.5), unreacted epoxy groups remain after the completion of the thiol-epoxy reaction. The epoxy-thiol curing process was measured to start at nearly identical onset temperatures ($T_{onset}$) for all thiol-to-epoxy ratios r studied, suggesting a reaction mechanism based on initiation by thiol/amine proton exchange.[4,11]

Figure 1B:
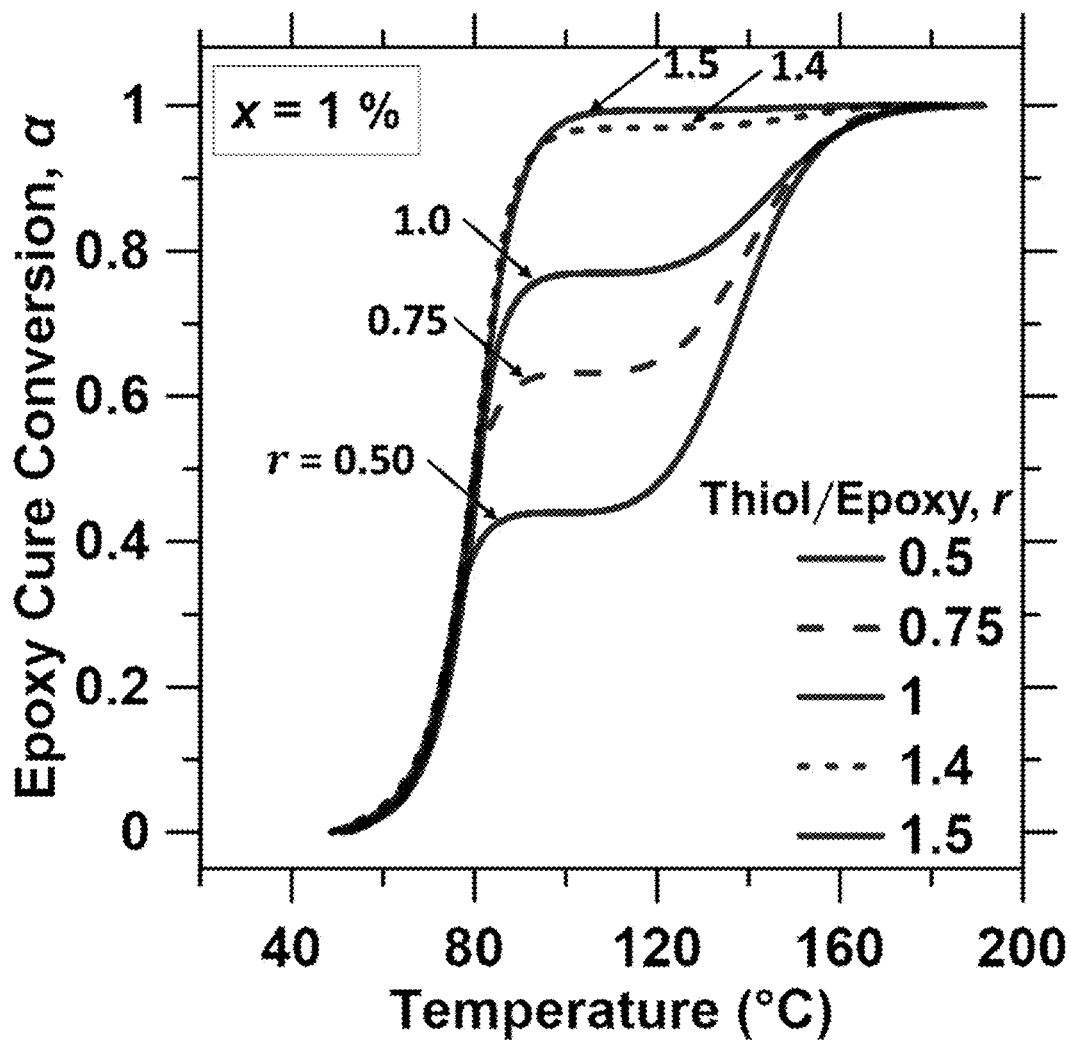

The calorimetric cure conversion ($\alpha$) curve (FIG. 1B) depicts the separation of the two cure processes and the difference in their reaction rates (FIG. 1B). The disparity between the reaction rates of the epoxy-thiol and epoxy homopolymerization processes is ascribed to the variation in the activity of the zwitterion that is formed as a result of the nucleophilic attack of the imidazole on the epoxy ring upon initiation (see reaction 1 in Scheme 1) in the presence of thiol groups.[8] In the presence of thiol groups, a fast acid-base proton exchange between the zwitterion leads to the formation of thiolate anions (reaction 2) which open the epoxy ring via nucleophilic attack to form an alkoxide anion (reaction 3).[8] Subsequently, a fast proton transfer takes place from a thiol group (or from the β-hydroxylimidazolium cation, which is formed in reaction 2), to yield the β-hydroxythioether. The proton transfer reaction that regenerates the initiator (reaction 5) proceeds at a significantly faster rate than the nucleophilic attack of the alkoxide anion on the epoxide ring.[1] Additionally, the transfer of a proton from thiols is three orders of magnitude faster compared to the transfer from secondary alcohols.[1,12] Thus, the concentration of alkoxide anions remains very low and the epoxy homopolymerization does not occur. However, in the absence of thiol groups in the system, the rapid acid-base proton exchange reactions cannot occur, and the slower epoxy homopolymerization becomes the dominant reaction. For further details regarding the homopolymerization reaction see Scheme 1.[3,8]

Scheme 1: Reaction scheme of the thiol-epoxy polycondensation catalyzed using MI.

Initiation

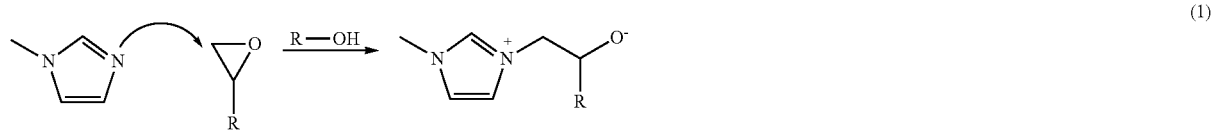

(1)

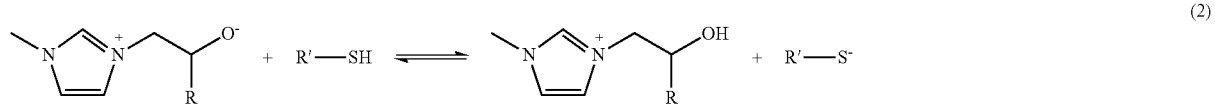

(2)

Epoxide ring opening and propagation

(3)

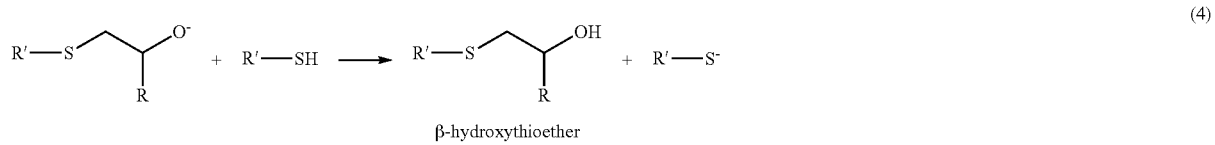

(4)

β-hydroxythioether

Termination/regeneration

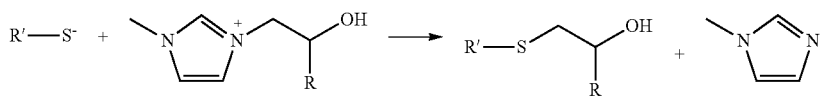

(5)

(1) nucleophilic attack of the imidazole on the epoxy ring resulting in the formation of the zwitterion; (2) acid-base proton exchange between the zwitterion and thiol leading to the formation of thiolate anion and β-hydroxylimidazolium cation; (3) Epoxide ring opening by thiolate anions via nucleophilic attack forming an alkoxide anion; (4) proton transfer from a thiol group (or from the β-hydroxylimidazolium cation) to alkoxide anion produce a β-hydroxythioether; (5) proton transfer reaction that regenerates MI. Here, the β-hydroxythioether (denoted as R-OH) is responsible for the autocatalytic effect.

The DSC thermograms in FIG. 1A depict the activation of the epoxy-thiol condensation reaction only upon reaching a certain temperature, suggesting the slow generation of active species and an induction period that can be controlled to ensure "thermal latency". Often, base-catalyzed epoxy-thiol reactions are difficult to control as they start immediately after the components are mixed and are strongly autocatalytic.[2,13] The thiol-epoxy reaction is strongly autocatalytic due to the formation of hydroxyl-group-containing species (i.e., the β-hydroxythioether) generated during the reaction, and which can, in turn, participate in proton exchange reactions that facilitate the ring-opening of the epoxides.[1,3,4] In base-catalyzed epoxy-thiol reactions, a higher rate of production of initial thiolate anions and the concomitant increase in the formation of β-hydroxythioether lead to a poor thermal latency and short induction period. In contrast, nucleophilic initiators with low basicity such as MI[8] and benzyldimethylamine[1] induce a slow initiation process and a subsequent strong auto acceleration up to the completion of curing at relatively lower temperatures. Imidazoles, in particular MI, also initiate anionic epoxy homopolymerization.[10] Herein, the nucleophilic initiator MI was found to initiate the epoxy-thiol curing reaction slowly and, hence, provided control over the curing process and a longer induction period.[1,8]

Figure 1C:
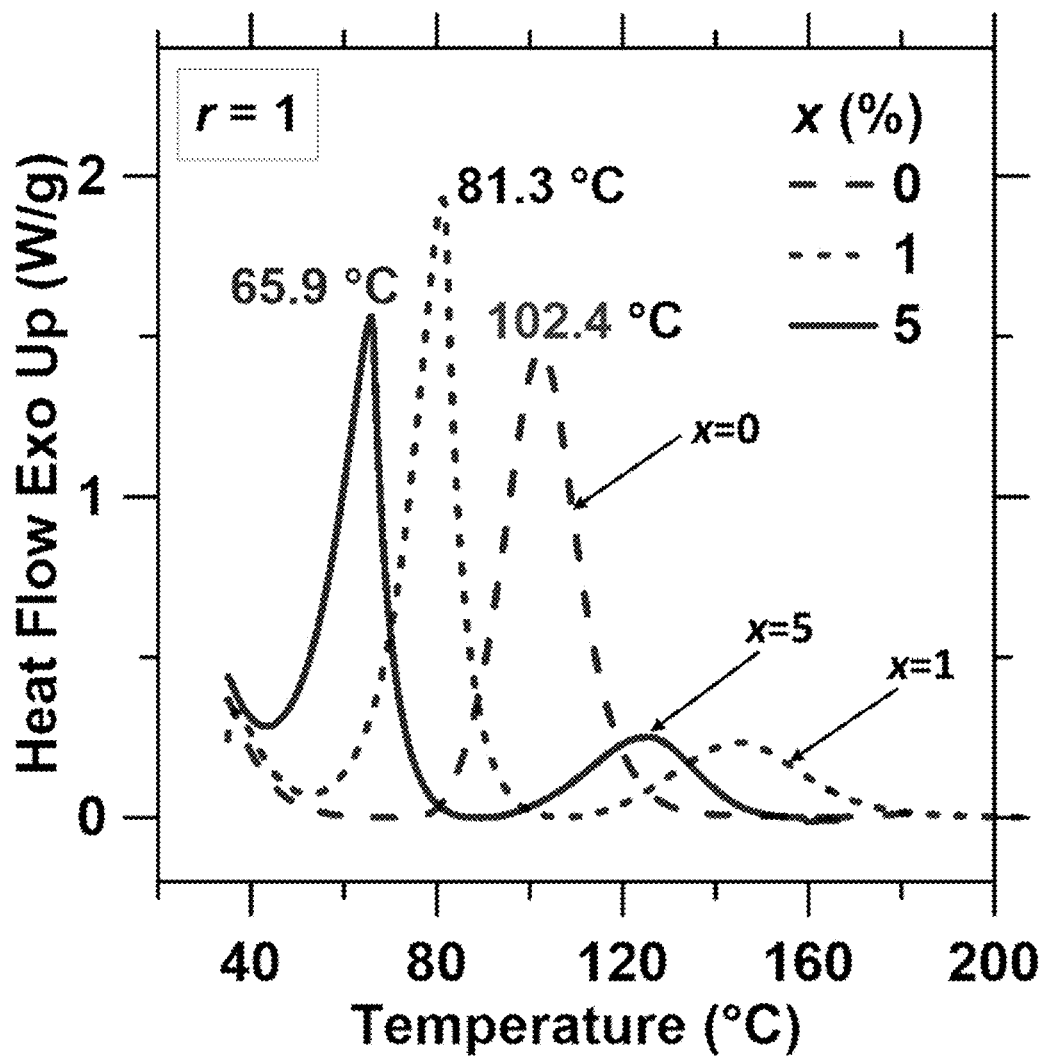
FIG. 1C shows DSC thermograms of epoxy-thiol mixture formulations with different x and a fixed r=1. All the nonisothermal DSC data were collected at a temperature ramp of 10° C. min$^{-1}$.
Figure 9:
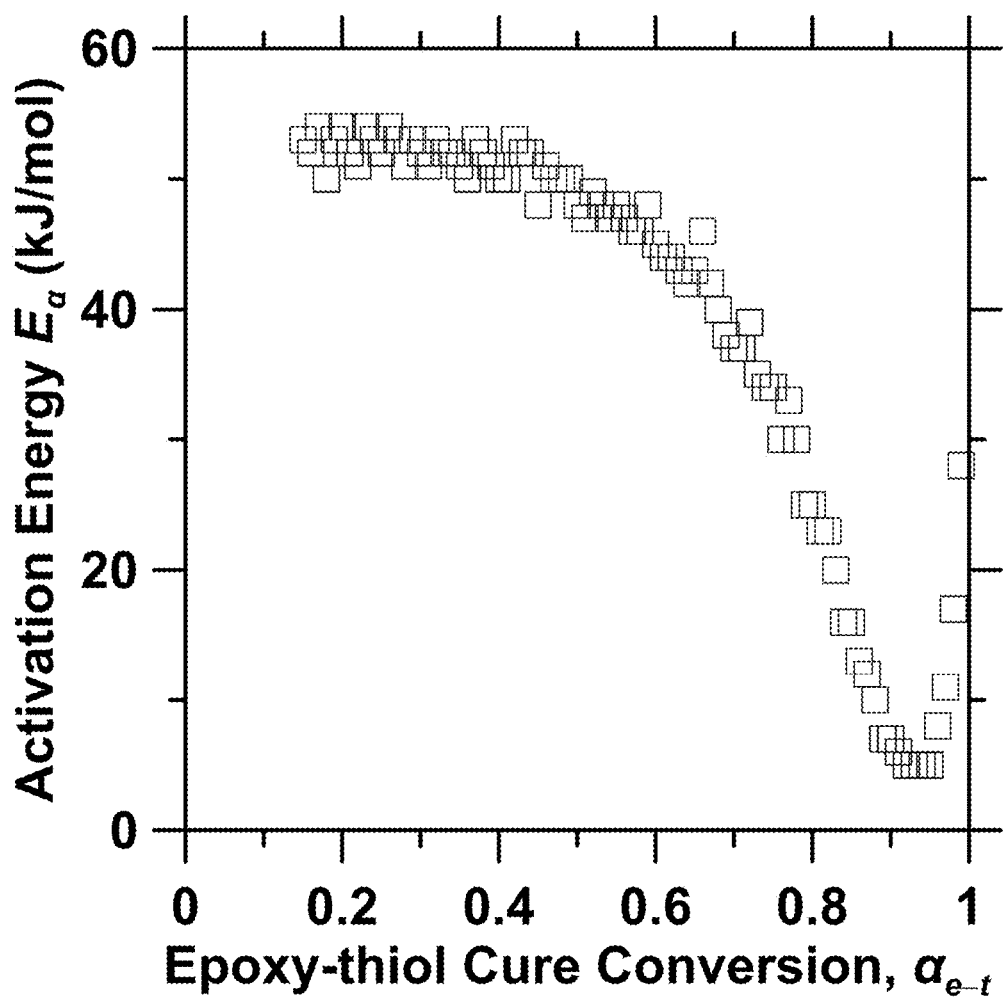
FIG. 9 shows the activation energy $E_a$ as a function of epoxy-thiol cure conversion $\alpha_{e-t}$ (i.e., the fraction of the first stage curing reaction) estimated by the integral isoconversional method for epoxy-thiol resin mixture (thiol-epoxy mass ratio, r=1, and initiator dosage, x=5% by mass of resin).

The activation energy, $E_a$ for the epoxy-thiol mixture decreased with an increase in epoxy-thiol condensation cure conversion (see Example 8 and FIG. 9). The higher initial $E_a$ reflects the difficult and slow initiation leading to a longer induction period and a decrease in $E_a$ with increasing cure conversion reflect the autocatalytic nature of the polymerization reaction.[4] Further, a higher dosage (x) of the initiator resulted in a lower $T_{onset}$ and improved cure rates (FIG. 1C); in the absence of the initiator $T_{onset}$ was the highest and the high-temperature epoxy homopolymerization did not occur over the studied temperature range (FIG. 1C).

The onset and rate of stiffening as well as the thermomechanical properties of the material can be tailored by controlling the extent of the epoxy-thiol condensation and epoxy homopolymerization by tuning the thiol-epoxy mixing ratio (r) in the formulation (FIGS. 1A-1B) and initiator dosage (x).[8] The use of excess epoxy groups in epoxy-thiol formulations yields substantial improvements of the thermal and mechanical properties emerging from the tighter network structure resulting from the epoxy homopolymer, yielding a higher glass transition temperature (see FIG. 2).[8,9,12] In these compositions, the stiffening onset temperature, the extent of stiffening, and the stiffening rate are all primarily governed by the extent of epoxy-thiol polycondensation reaction, while the final mechanical strength of the completely cured formulations is controlled by the extent of the epoxy homopolymerization reactions. Hence, it is possible to design mixture compositions that can produce: 1) targeted epoxy-cure conversion and gelation after the first curing stage (i.e., for the rapid, low-temperature epoxy-thiol curing reaction), and 2) targeted mechanical strength upon completion of the epoxy homopolymerization.

Example 3: Thermomechanical Behavior of Mineral Suspensions

Figure 3A:
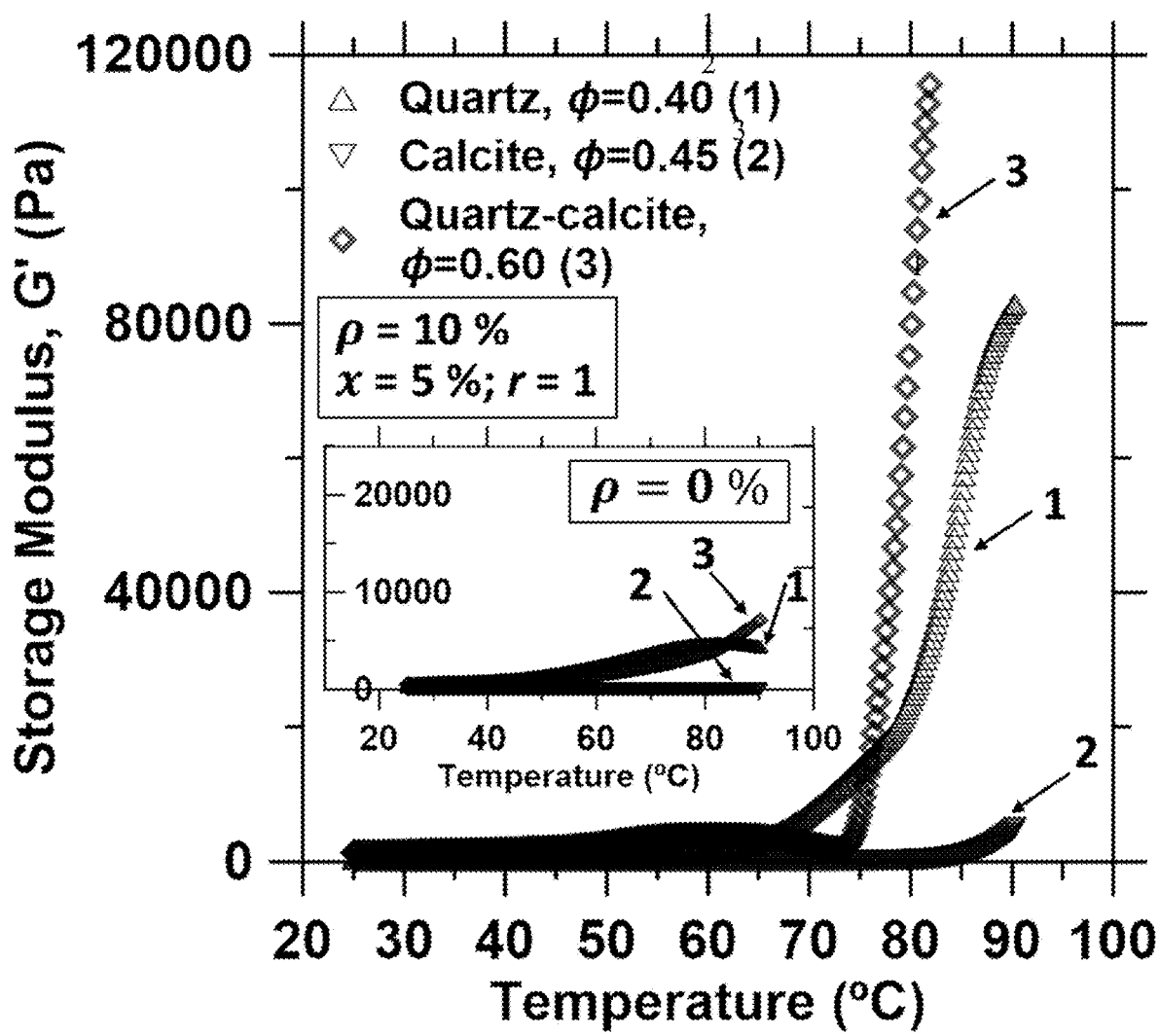
FIG. 3A shows small amplitude oscillatory shear (SAOS) analysis results illustrating the variation in elastic modulus G' with temperature for different thermoresponsive suspensions across a range of solid loadings: quartz (solid volume fraction, $\phi$=0.40), calcite ($\phi$=0.45), 40/60 quartz-calcite mixture ($\phi$=0.60). The inset shows the G' variations with temperature for suspensions without resin.

The thermoresponsive stiffening of the epoxy-thiol formulations was harnessed to induce thermally-triggered stiffening in mineral suspensions. FIG. 3A shows the evolution of storage modulus G' of concentrated suspensions of quartz, calcite, and a 40/60 mixture of quartz and calcite, with temperature. In all cases, G' remained essentially unchanged below a critical temperature (i.e., stiffening onset temperature, $T_c$ estimated as the temperature at which $dG'/dt \geq 10$ Pa/s from the baseline) and an abrupt increase in G' was observed when heated beyond $T_c$ (see FIG. 3B). These thermostiffening responses are in stark contrast to the thermal response of suspensions without the thermoset resin that do not exhibit any appreciable increment in the value of G' with temperature (see inset of FIG. 3A). Similar trends were observed in the dynamic loss modulus (G") and the complex viscosity ($|\eta^*|$) across all suspensions, and the material response remained predominantly elastic (i.e., G'>G"). The increase in dynamic moduli and viscosity beyond $T_c$ is a direct result of the epoxy curing and polymer network build-up within the suspension matrix. As curing proceeds, the number of crosslinks in the polymer network and the gel fraction increase, leading to the formation of a rigid 3D-network around the mineral particles.[14] The crosslinked polymer networks increasingly resist the deformation and relaxation of the particle aggregates network, thereby restricting shear deformation and inducing a fluid-like to solid-like transition in the suspensions.

Figure 3B:
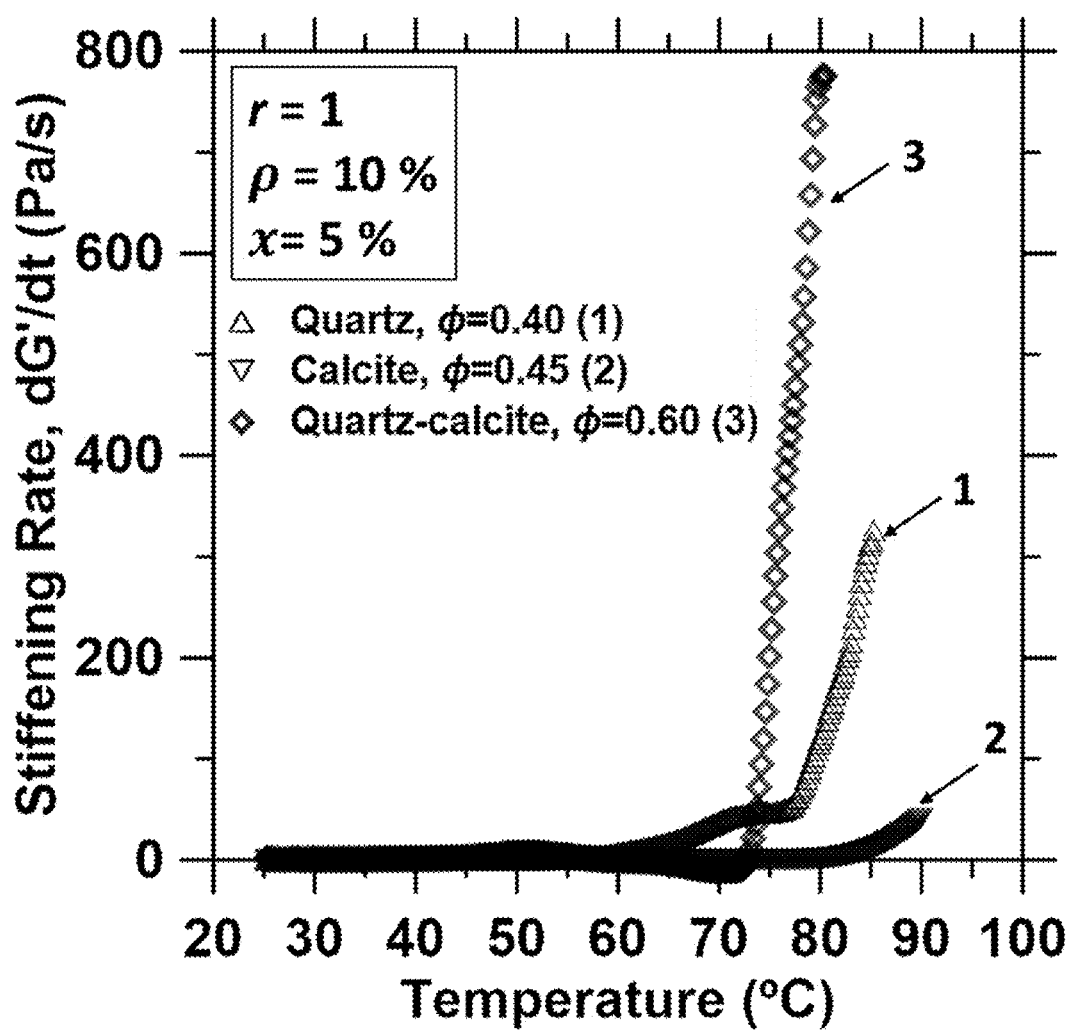
FIG. 3B shows evolution of rate of change of G' (i.e., dG'/dt) as a function of the temperature.
Figure 3C:
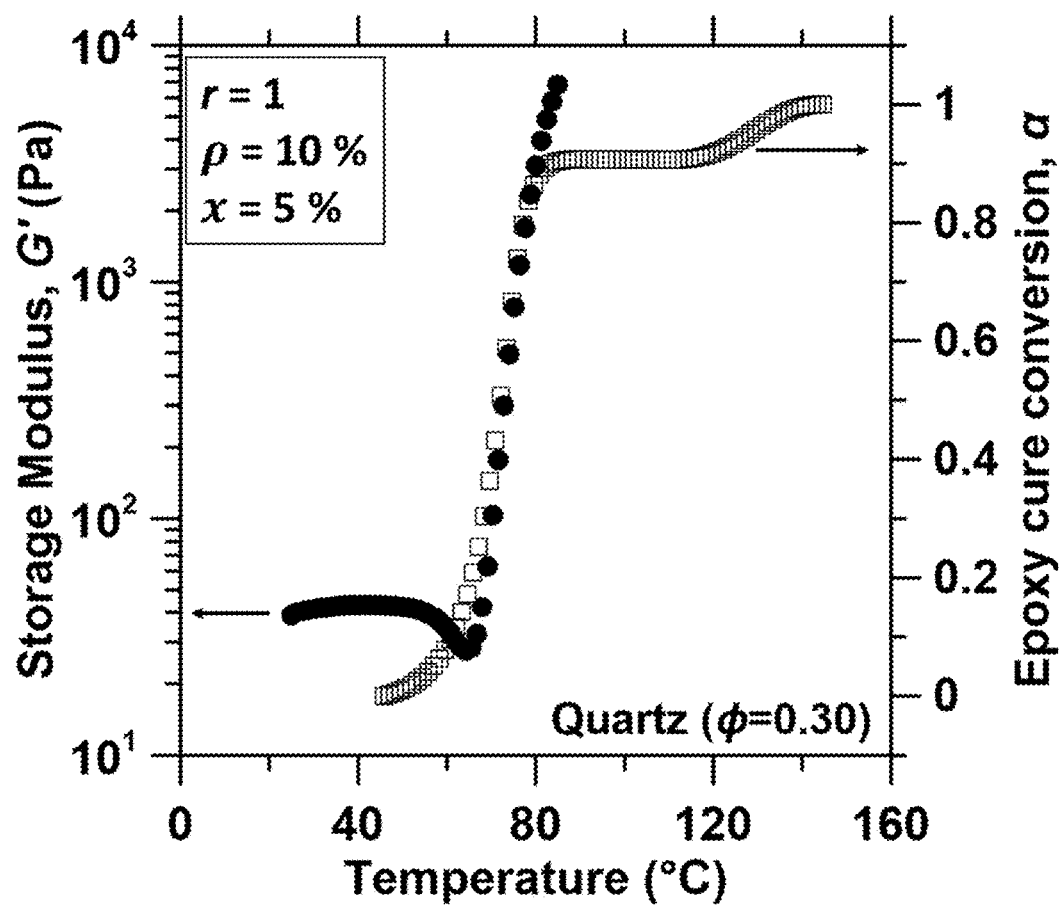
FIG. 3C shows illustration of the evolution of the elastic modulus and epoxy-thiol cure conversion in quartz suspension ($\phi$=0.30) subjected to an identical heating rate. Note: for all data presented here, G' evolutions were recorded during SAOS measurements with a temperature ramp of 2° C./min. The epoxy-thiol conversion was estimated by integrating the DSC thermograms for a temperature ramp of 2° C./min. For all the thermosensitive suspension formulations, resin dosage, $\rho$=10% by mass of mineral particulate; initiator dosage, x=5% by mass of resin, thiol-epoxy mass ratio, r=1.

Interestingly, suspensions of different mineral particulates exhibited significant differences in their thermostiffening response (FIGS. 3A-3B). The thermal latency, the induction period, $T_c$, the fluid-to-solid transition temperature window, and the stiffening rate all depended on the type of mineral particulates and the solid loading (φ) in the suspensions (FIG. 3B). These variations can be attributed, but not limited to, the differences in φ, the dispersion state of mineral particles, particle size, particle shape, resin-mineral interactions, and the pH of the suspending medium, which in turn can, influence the gelation kinetics.[15-17] Notably, resin incorporation into the mineral suspensions also resulted in a substantial increase in the low temperature G' in calcite and quartz-calcite binary mixture-based suspensions. This could be ascribed to the enhanced aggregation of calcite particles around a pH of ~8.2 which is close to its isoelectric point (IEP) in the pH range of 8-9.5.[18] Nevertheless, it is evident that the epoxy-thiol resin mixture formulations can be adjusted to produce rapid, low temperature curing reactions irrespective of the mineral particles. A 1:1 correspondence between the progress in curing and stiffening is evident from FIG. 3C. A comparison of the evolution of G' and the cure conversion α at the same heating rate (2° C./min) for quartz suspensions (φ=0.30) demonstrates that the sharp increase in modulus takes place only after achieving a threshold epoxy cure conversion. Here, the critical Temperature $T_c$~70° C. estimated from the G' evolution corresponds to an epoxy cure conversion of α=0.40. Theoretically, gelation should occur at a certain α that depends primarily on the functionality of the epoxy and the thiol curing agent.[19] But, in addition to the resin and crosslinking agent functionality, solid content, particle size, particle shape, suspending medium, and use of surface treatments all affect α.[15,20]

Example 4: Optimizing Thermoresponsiveness of Mineral Suspensions

Figure 4A:
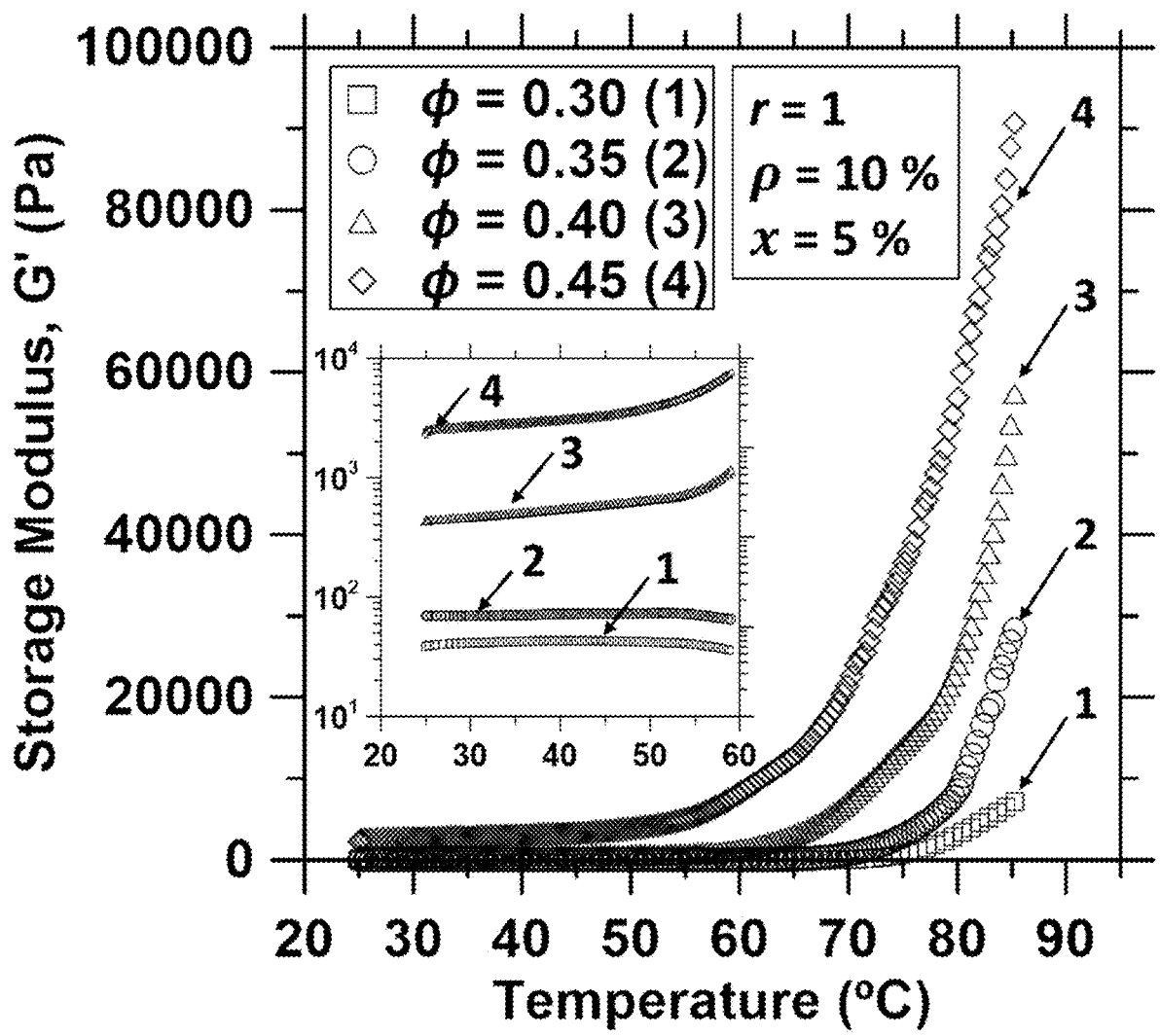
FIG. 4A shows SAOS results showing the variation in elastic modulus G' with temperature for quartz suspensions with different solid loadings $\phi$.
Figure 4B:
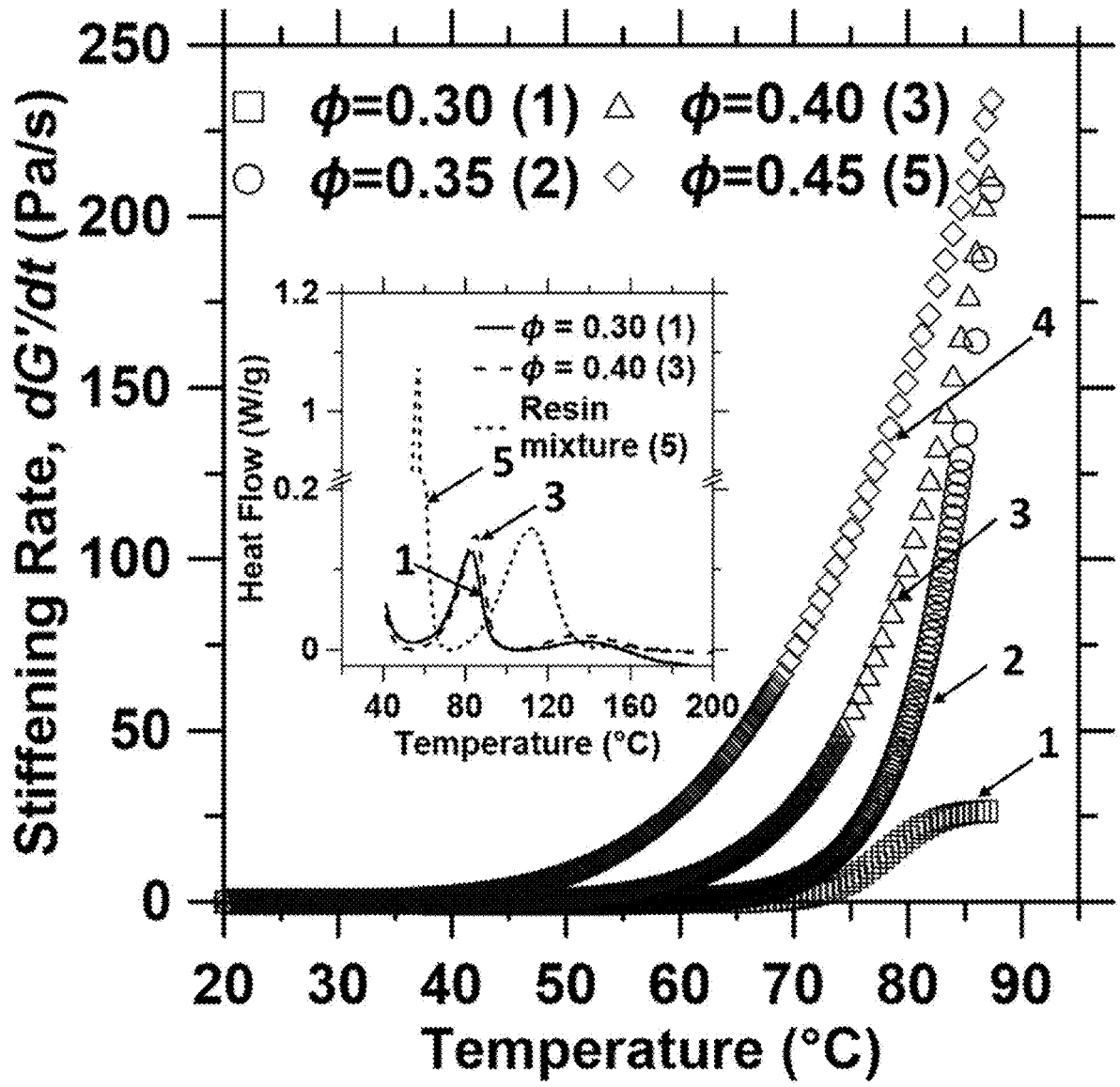
FIG. 4B shows SAOS results showing the evolution of the rate of change of elastic modulus G' (i.e., dG'/dt) with temperature for quartz suspensions for different $\phi$. The inset plot shows DSC thermograms at 5° C./min for epoxy-resin mixture and quartz suspensions for different quartz contents (resin dosage, $\rho$=10% by mass of quartz, initiator dosage, x=5% by mass of resin, thiol-epoxy mass ratio, r=1).

The optimization of suspension formulations is necessary to reduce cost and augment the performance of thermosensitive materials. Here, near-inert quartz suspensions (i.e., very low dissolution rate) were chosen to illustrate and tailor thermoresponsive behavior and to elucidate the influence of solid volume fraction, resin content, initiator dosage, and the thiol-epoxy mixing ratio on the stiffening rate and mechanical strength of the cured composites. For instance, the thermally triggered stiffening of the mineral suspensions was affected by the solid volume fraction (φ=0.30-0.45; see FIG. 4A and FIG. 4B). $T_c$ reduced and G' increased at a faster rate upon activation of polymerization reactions with increasing φ (FIG. 4A and FIG. 4B). Similar behavior has been previously reported for epoxy resin systems with silica fillers.[15,21,22] Insights into the physical underpinnings of these trends were sought by monitoring the curing kinetics of the epoxy-thiol resin mixtures and the epoxy-thiol-quartz suspensions with varying φ. The exotherm height and area decreased while the peak exotherm temperature shifted to higher values for the epoxy-thiol-quartz suspensions as compared to the epoxy-thiol mixture (see inset of FIG. 4B). The decrease in the exotherm height and area is a consequence of the decreasing proportion of epoxy resin in the sample as the DSC heat flow signals are normalized with respect to the total mass of the sample. The broader epoxy-thiol curing exotherms of the suspensions as compared to a relatively sharper exotherm of the epoxy-thiol mixture suggest a slower cure reaction rate in suspensions. The retardation of the cure reaction and shift to higher temperatures in the mineral suspensions can be attributed to dilution effect (by the filler) and the increased viscosity of the formulation.[15,23,24] However, the total heat of epoxy-thiol cure reaction Δh per epoxy equivalent showed no significant variation for both the systems (the average Δh was found to be 104±4 kJ/eq). Furthermore, no significant variation in peak exotherm temperature and the heat of reaction were observed upon increasing φ from 0.30 to 0.40. Thus, while the curing reaction is retarded in the mineral suspensions, the nearly constant heat of reaction suggests that the epoxy-thiol network structure formed during cure is not significantly influenced by the presence of the filler. In addition, the decrease in $T_c$ with increasing φ cannot be ascribed to faster cure kinetics. Rather, the decrease in $T_c$ and the higher stiffening rate can rather be attributed to a decrease in the value of α required for the formation of a percolating network within the suspension. Because the particle aggregates are closer to each other in suspensions comprising higher φ), the percolating network that restricts the particle-aggregate mobility and deformation forms at lower α, resulting in a reduced $T_c$.[21,15]

Figure 5A:
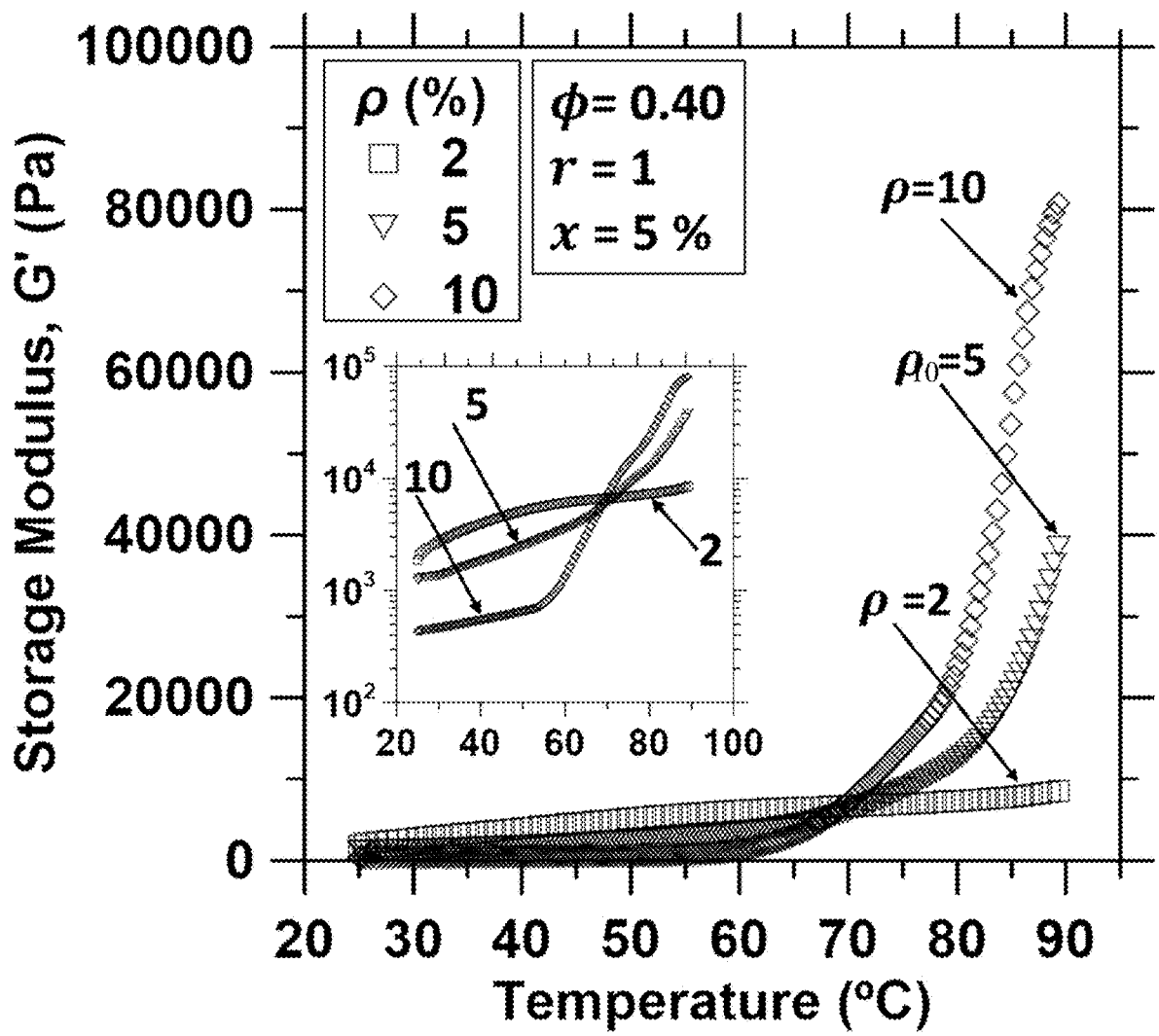
FIG. 5A shows SAOS results illustrating the variation in elastic modulus G' with temperature for quartz suspensions with different resin dosages p. The inset plot shows G' evolution in log scale illustrating the reduction in low-temperature modulus with increasing p (with solid volume fraction, $\phi$=0.40, thiol-to-epoxy mass ratios r=1 and initiator dosage, x=5% by mass of resin).

The thermoresponsive stiffening of the suspensions became increasingly evident as the resin loading in the suspension was increased (FIG. 5A). At the same time, the initial elastic modulus (i.e. low-temperature modulus) decreased as the resin content increased, suggesting an improved dispersion state of quartz particles (inset of FIG. 5A).[25] The increase in resin content builds a denser cross-linked polymer network and binds the particle aggregates together, thereby enhancing thermo-stiffening. Thus, the resin dosage plays an essential role in controlling the low- and high-temperature fluidity and the thermoresponsiveness of these suspensions.

Figure 5B:
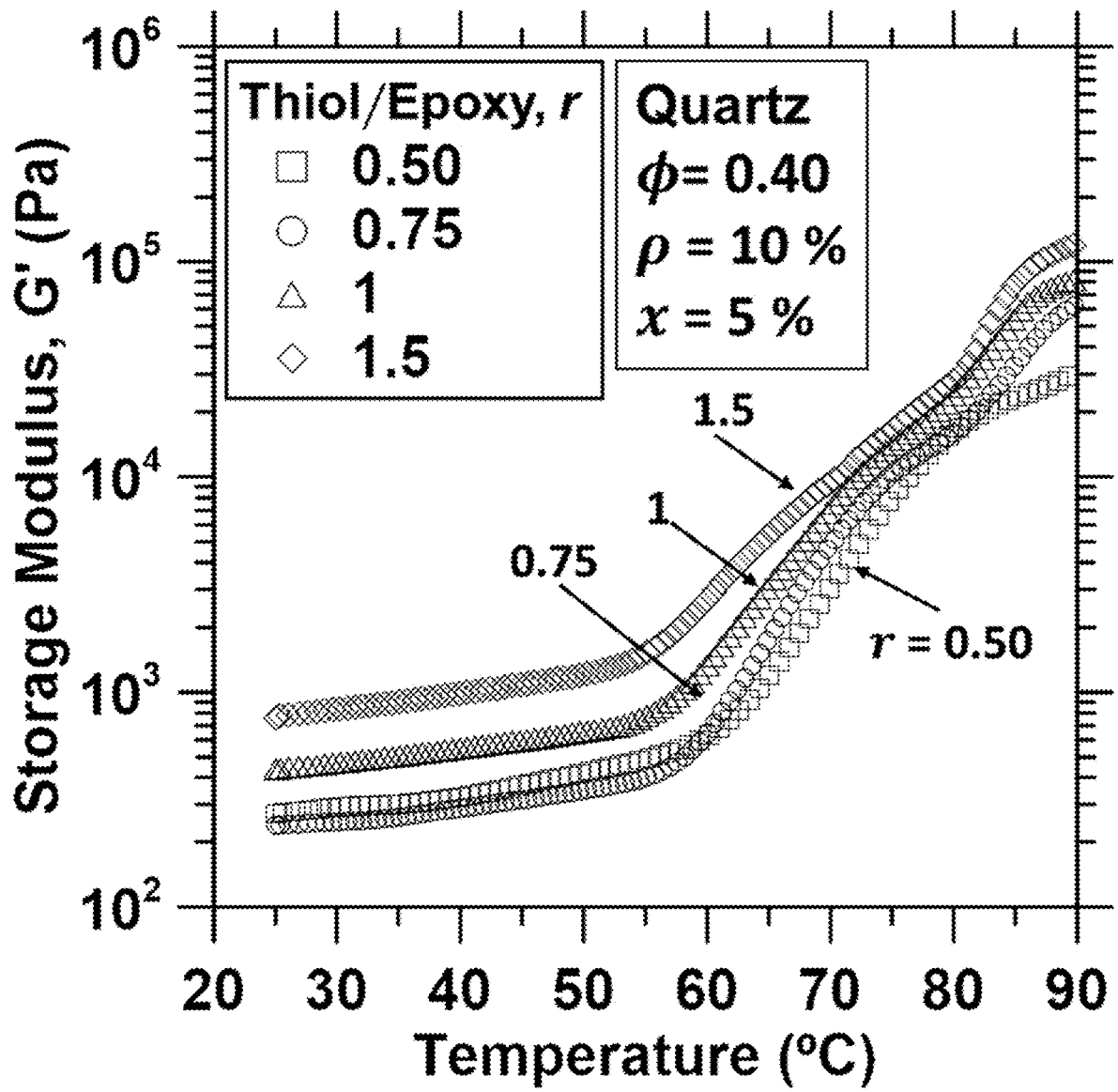
FIG. 5B shows SAOS results illustrating the variation in G' with temperature in a semi-log scale for different quartz suspension formulations comprising different r (with $\phi$=0.40, $\rho$=10% by mass of quartz and x=5% by mass of resin.
Figure 5C:
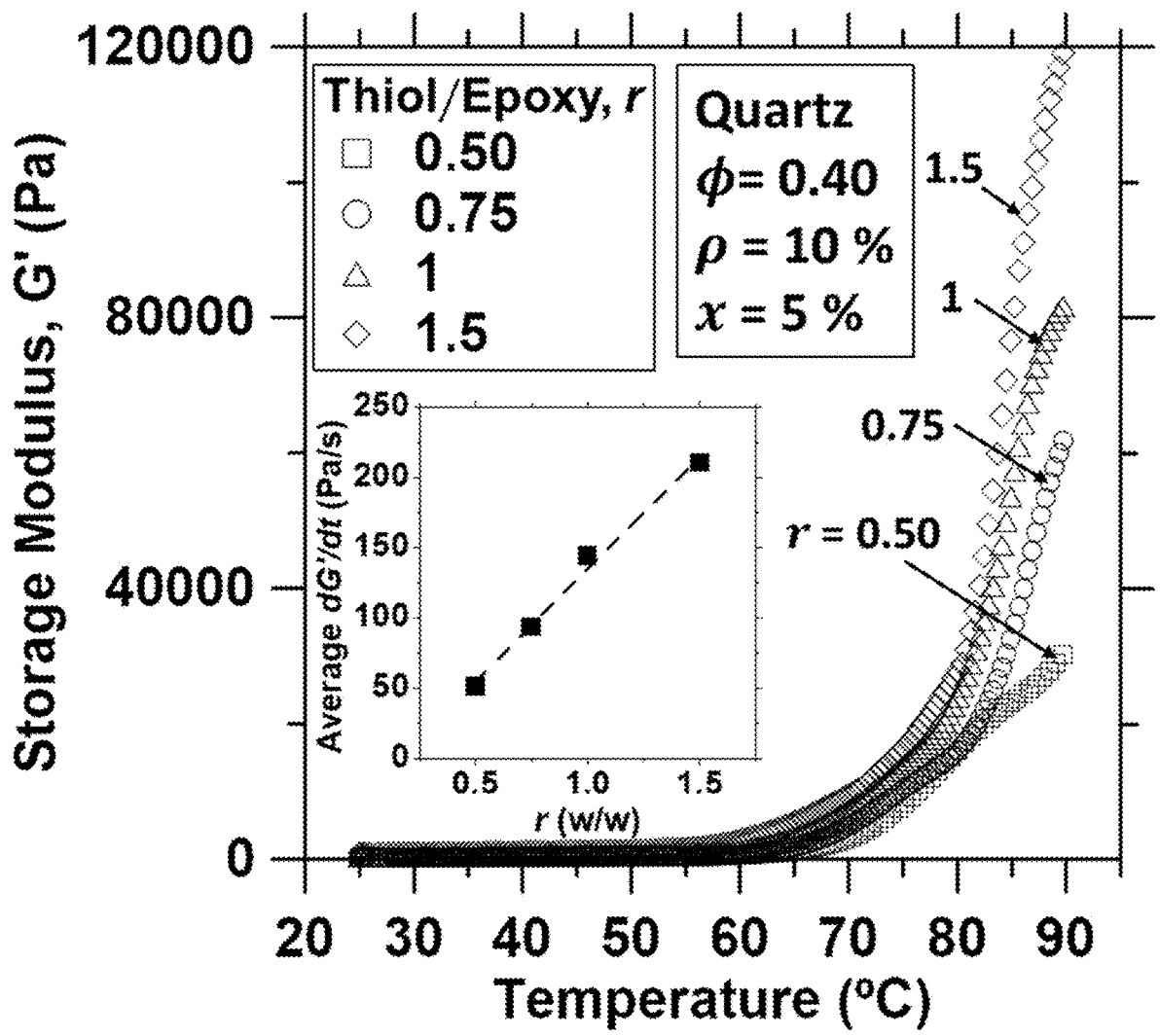
FIG. 5C shows variation in G' of quartz suspensions as a function of temperature in linear scale for formulations with different, r. The inset plot shows variations in the average stiffening rate (i.e., stiffening rate above Tc is averaged) as a function of r (with $\phi$=0.40, $\rho$=10% by mass of quartz and x=5% by mass of resin).

The thiol-to-epoxy mixing ratio affects the thermoresponsive stiffening as well as the mechanical strength of the cured hybrid composites (FIG. 5B and FIG. 5C). An increase in r resulted in an enhanced average stiffening rate (i.e., the average value of dG'/dt between $T_c$ and 90° C., see inset of FIG. 5C), a modest decrease in the stiffening onset temperature, and a significant increase in the low temperature G' (see FIG. 5B). While the enhancement in the stiffening rate can be ascribed to the increasing contribution of the epoxy-thiol curing (i.e., the rapid and low-temperature curing that induces stiffening at temperatures below 90° C.) to the total epoxy curing, the enhancement in low temperature G' suggests an aggregated particle state. A higher extent of aggregation is also expected to reduce the required cure conversion for the gelation, leading to a decrease in the stiffening onset temperature. We note that epoxy-thiol mixtures with r<0.5 were reported to gel at the end of the first stage curing.[8] Hence, formulations with r<0.5 are not effective in inducing rapid thermosetting at temperatures below 90° C. Overall, we observe that formulations with r>0.75 crosslinked effectively during the first stage of curing, exhibiting rapid stiffening with an average stiffening rate >100 Pa/s, which increases with increasing r (FIG. 5C).

These trends in the thermostiffening response of the suspensions with varying r were contrasted against the flexural strength and strain capacity of the cured composites to illustrate the effect on cured material properties due to the two stage-polymer network formation. Formulations composed of a 40/60 mixture of quartz and calcite with φ=0.50, 0.55 and 0.60 were chosen to evaluate the impact of r on the flexural strength because: (1) their φ values are high enough to provide MPa level flexural strength while minimizing porosity and drying shrinkage, (2) the uncured suspensions exhibited sufficiently low viscosity at room temperature to ensure ease of flow through the extruder without clogging (e.g., for 3D-printing applications), and (3) at T>$T_c$ the suspensions exhibited rapid thermoresponsive stiffening.

Figure 6A:
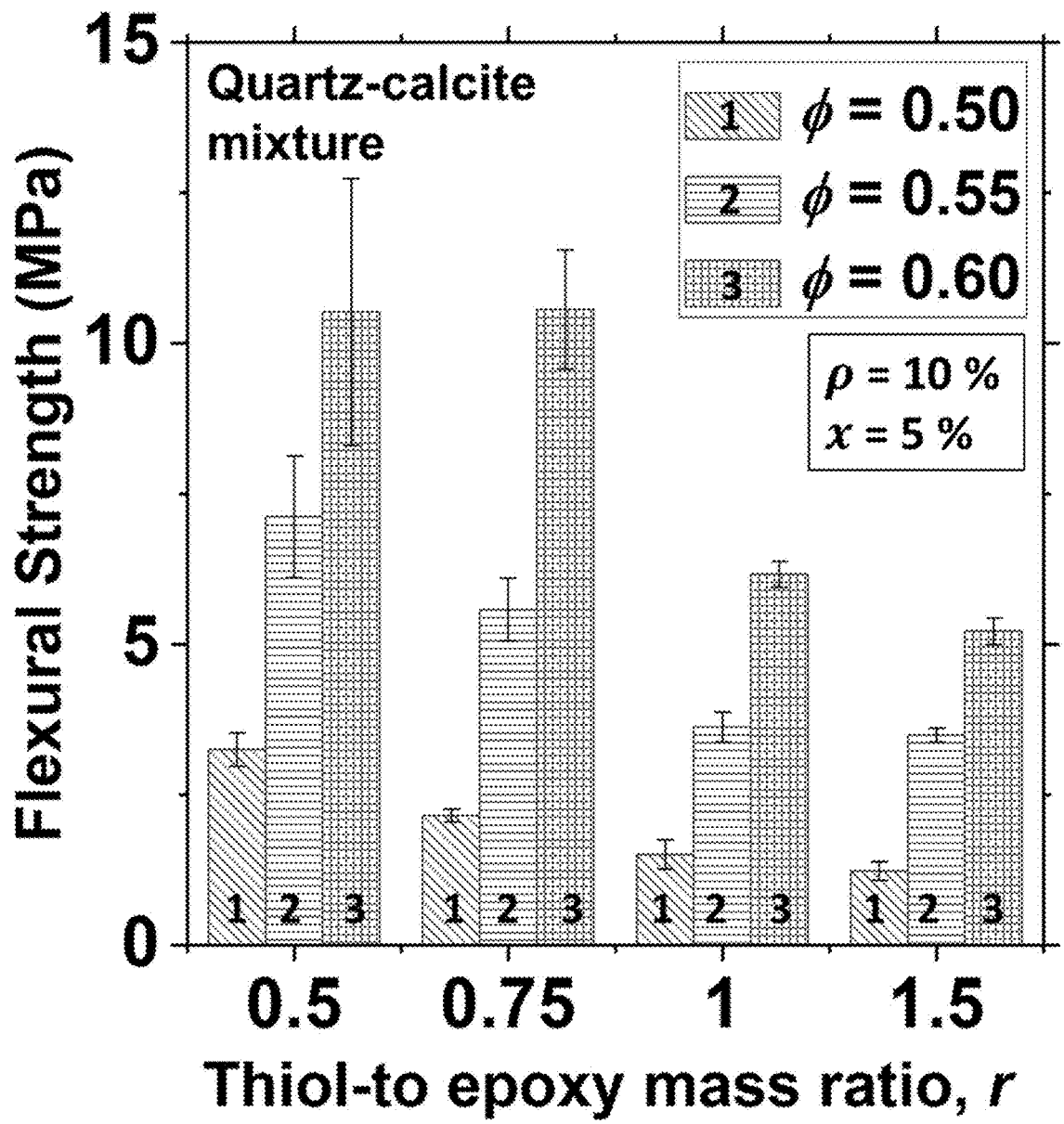
FIGS. 6A-6B show an illustration of the variation in flexural strength (FIG. 6A) and failure strain (FIG. 6B) of cured composites (for 40/60 quartz-calcite mixture suspensions with solid volume fractions, $\phi$=0.50, 0.55 and 0.60, resin dosage, $\rho$=10% by mass of mineral particulates and initiator dosage, x=5% by mass of resin) as a function of thiol-to-epoxy mass ratio, r.
Figure 6B:
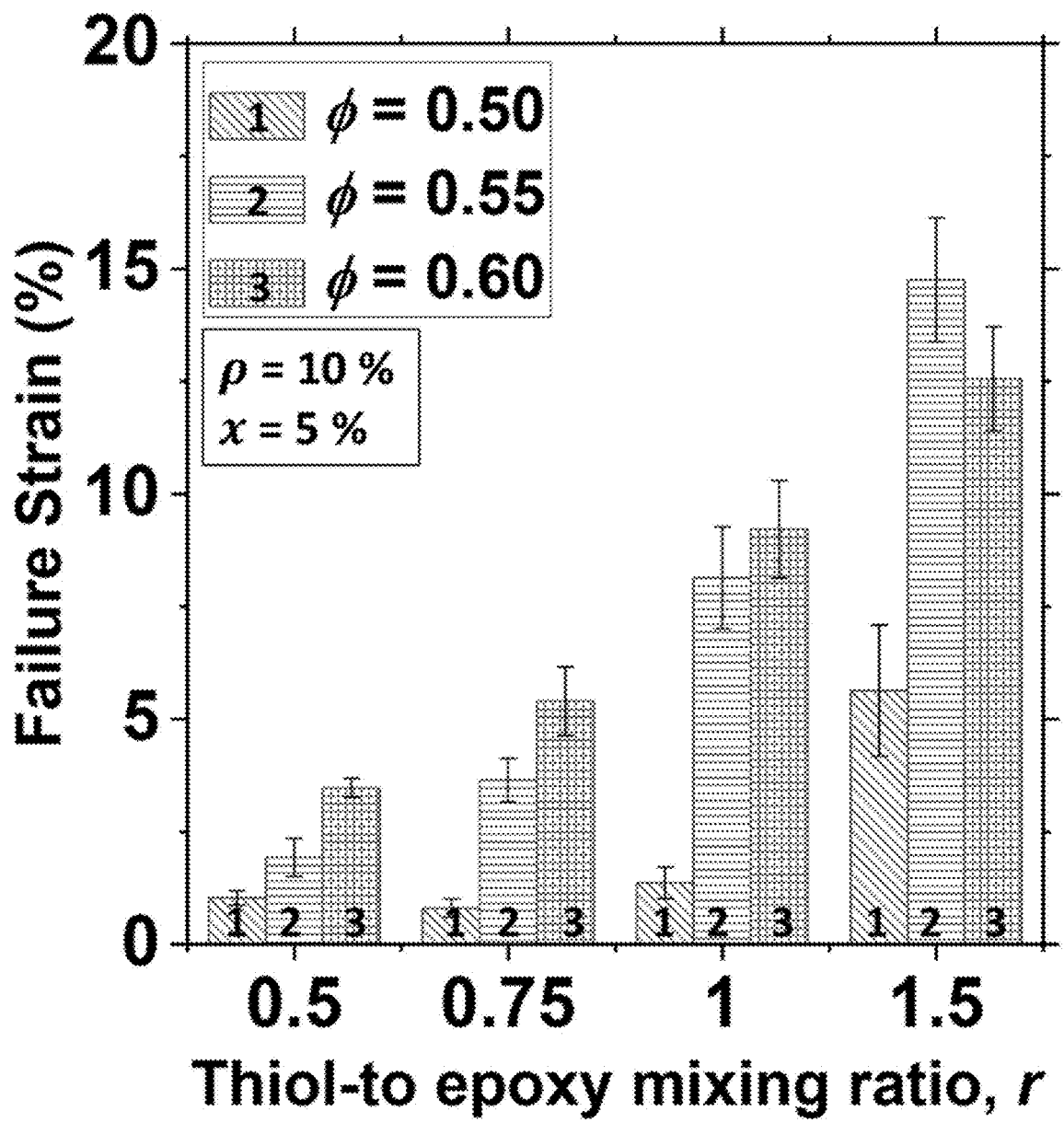

The flexural strength of the cured composites increased with decreasing r (FIG. 6A). For suspensions with φ=0.60, the cured composites exhibited a two-fold increase in flexural strength when r is reduced from 1.5 (the stoichiometric formulation) to 0.5 (FIG. 6A). The higher strength with decreasing r points to the formation of a tighter crosslinked polymer structure with an increasing fraction of epoxy homopolymer when formulated with excess epoxy (r<1.5). Concomitantly, the failure strain of the cured composites reduced significantly with decreasing r (FIG. 6B). The decrease in $T_g$ of epoxy-thiol resin mixtures with increasing r (FIG. 2) corroborates the increasing flexural strain capacity of the corresponding hybrid composites. The crosslinked polymer network, being central to the overall mechanical response of the hybrid composites, becomes rubbery and more flexible as $T_g$ drops below the ambient temperature with increasing r. Thus, an optimal r for a thermosensitive formulation can be chosen to produce a targeted stiffening rate and final mechanical strength of the cured composite.

Figure 7B:
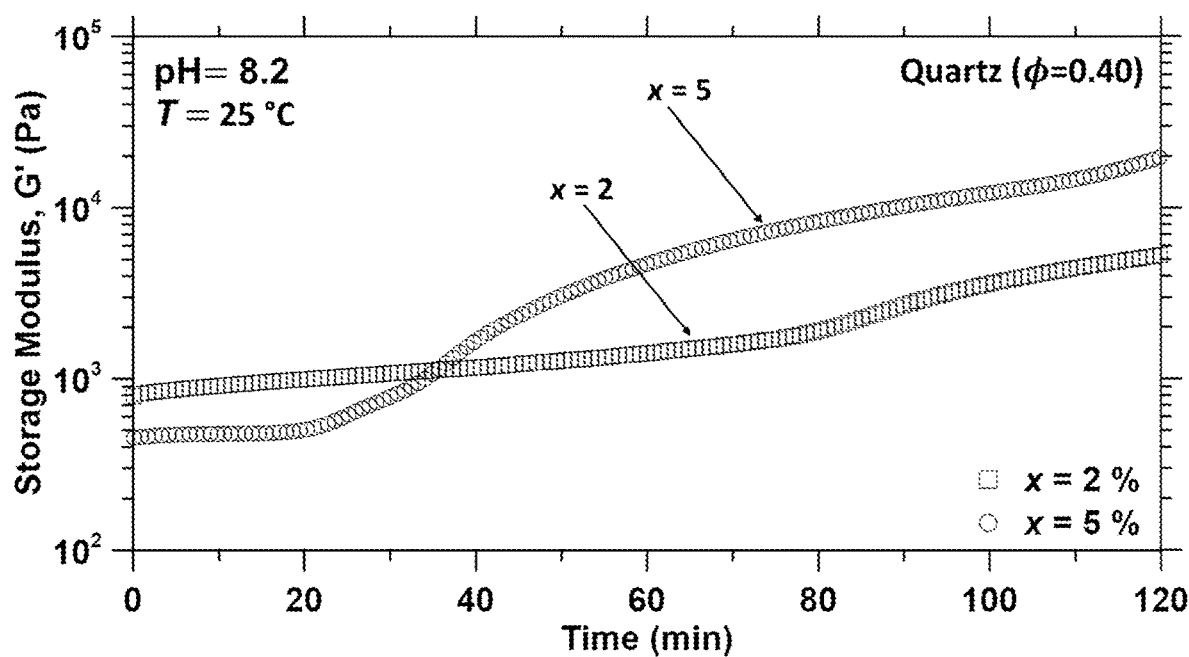
FIG. 7B shows SAOS results depicting the variation in G' at 25° C. with time for quartz thermoresponsive suspensions ($\phi$=0.40) with different $\rho$ (with r=1) to illustrate their thermal latency.

At the same time, optimization of the initiator dosage (x) offers a route to modulate thermal latency and the induction period before the onset of thermostiffening response. An ideal nucleophilic initiator at an optimal dosage should offer a long induction period and asymptotically slow activation of the curing reaction at temperatures below the activation temperatures (i.e., $T<T_c$), and strong auto acceleration of the curing reaction when the suspension is heated above the activation temperature.[3] Increasing the dosage of the MI initiator resulted in a decrease in $T_c$ and an increased stiffening rate of the suspensions (FIG. 7A) while decreasing their low-temperature G' (see inset of FIG. 7A). An initiator dosage of 5% of MI helps to bring down $T_c$ below 60° C. and produces a sharp two orders of magnitude increase in G' with an average stiffening rate of 144 Pa/s (red curve in FIG. 7A). The reduction in $T_c$ and the improved stiffening response at higher initiator concentrations can be attributed to the enhanced curing kinetics facilitated by the generation of a larger number of active species. Even though a higher x results in the reduction in $T_c$, it can adversely affect the thermal latency and shorten the induction period. Quartz suspensions with x=5% initiator exhibited a faster evolution of G' at room temperature (i.e., 25° C.) than a suspension with x=2%, indicating initiation of the crosslinking reaction is promoted by the higher concentration of the initiator (FIG. 7B). Thus, high x can accelerate epoxy-thiol cure kinetics leading to a shorter induction period and compromised thermal latency.

Example 5: Design Guidelines for Thermoresponsive Suspensions

Figure 6C:
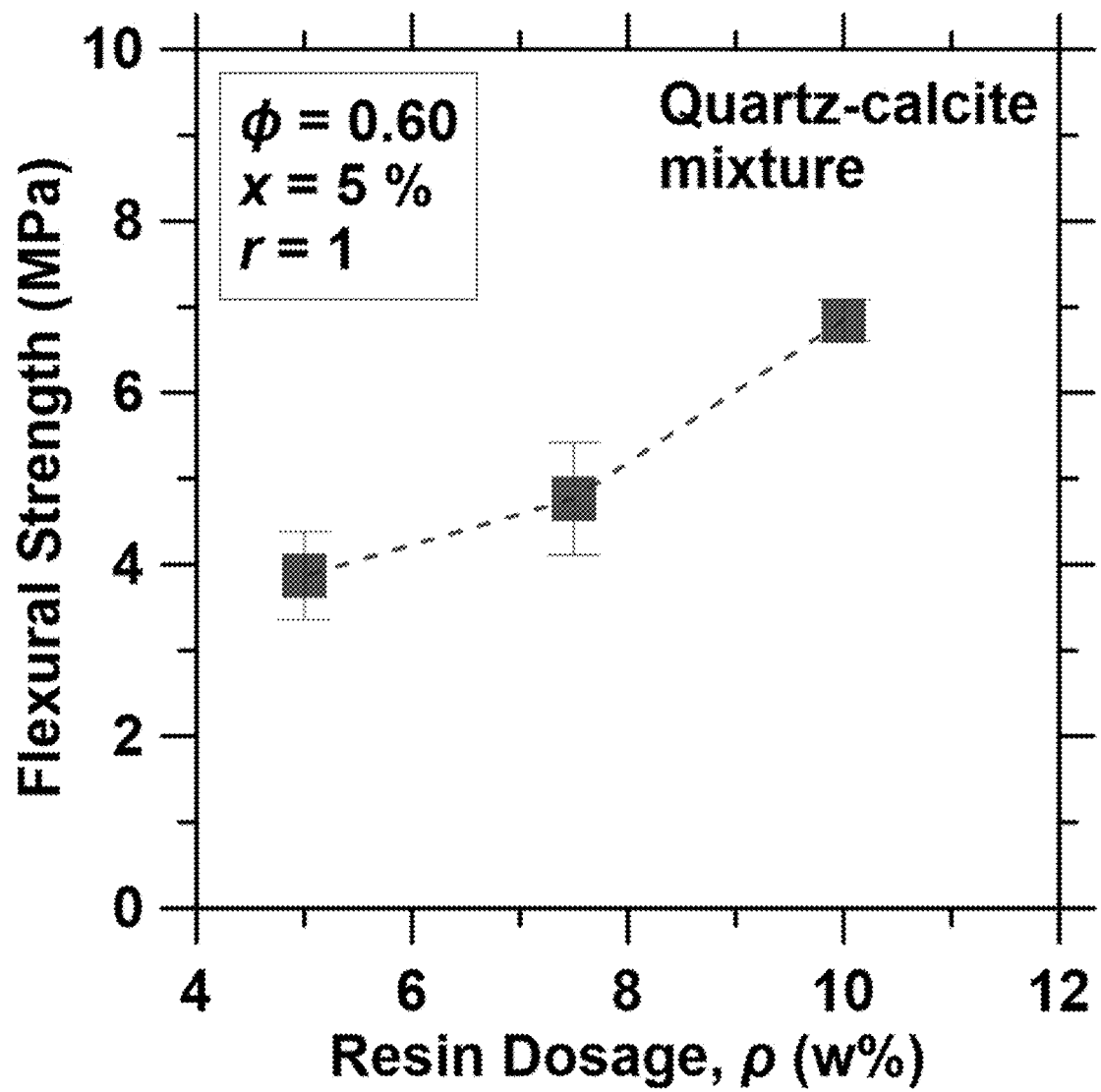
FIG. 6C shows the variation in the flexural strength of the composites as a function of $\rho$ (for 40/60 quartz-calcite mixture suspensions with $\phi$=0.60, x=5% by mass of resin, r=1).
Figure 6D:
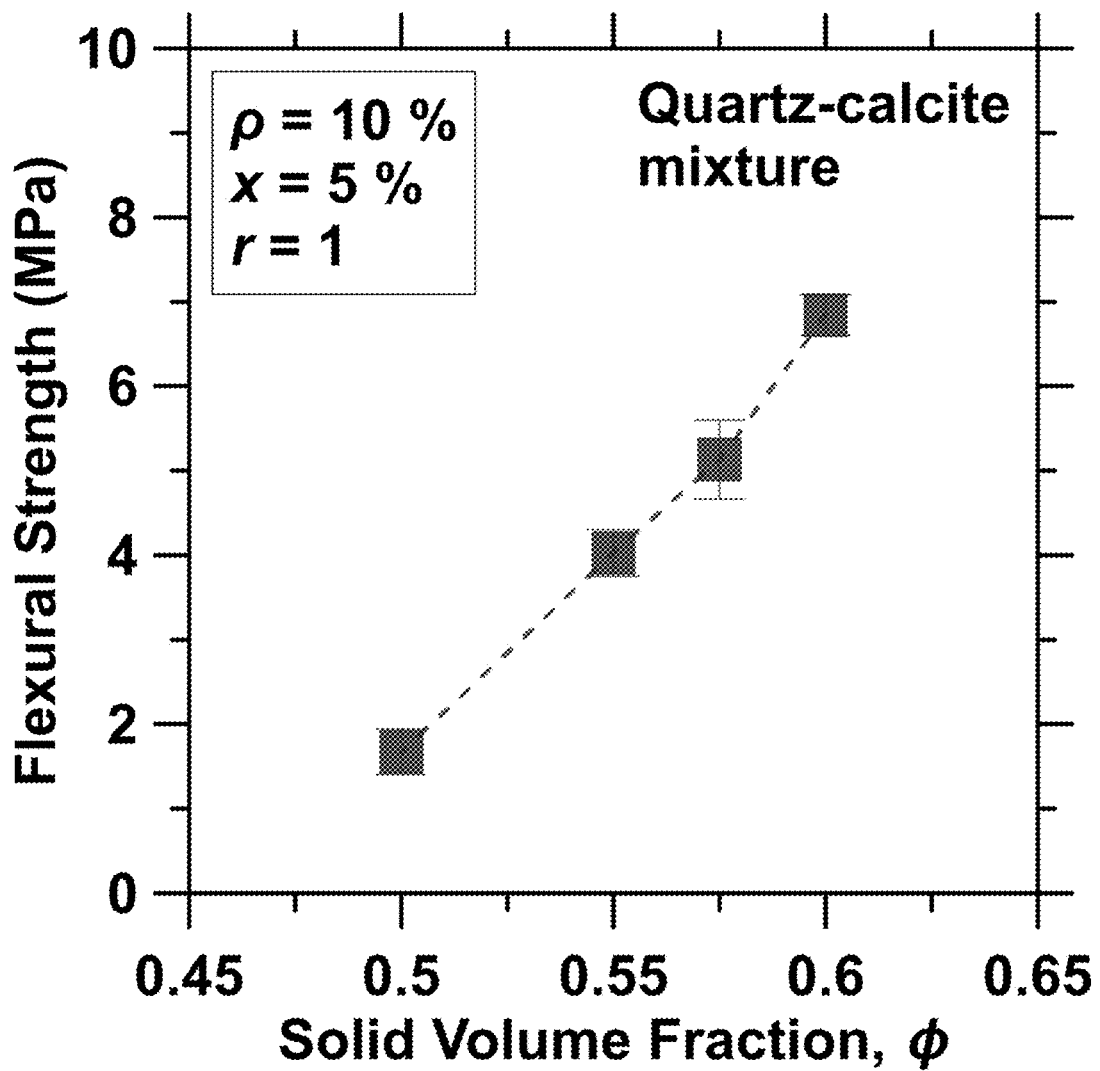
FIG. 6D shows variation in the flexural strength of the hybrid composites as a function of $\phi$ (for 40/60 quartz-calcite mixture suspensions with $\rho$=10% by mass of mineral particulates, x=5% by mass of resin, r=1).
Figure 8:
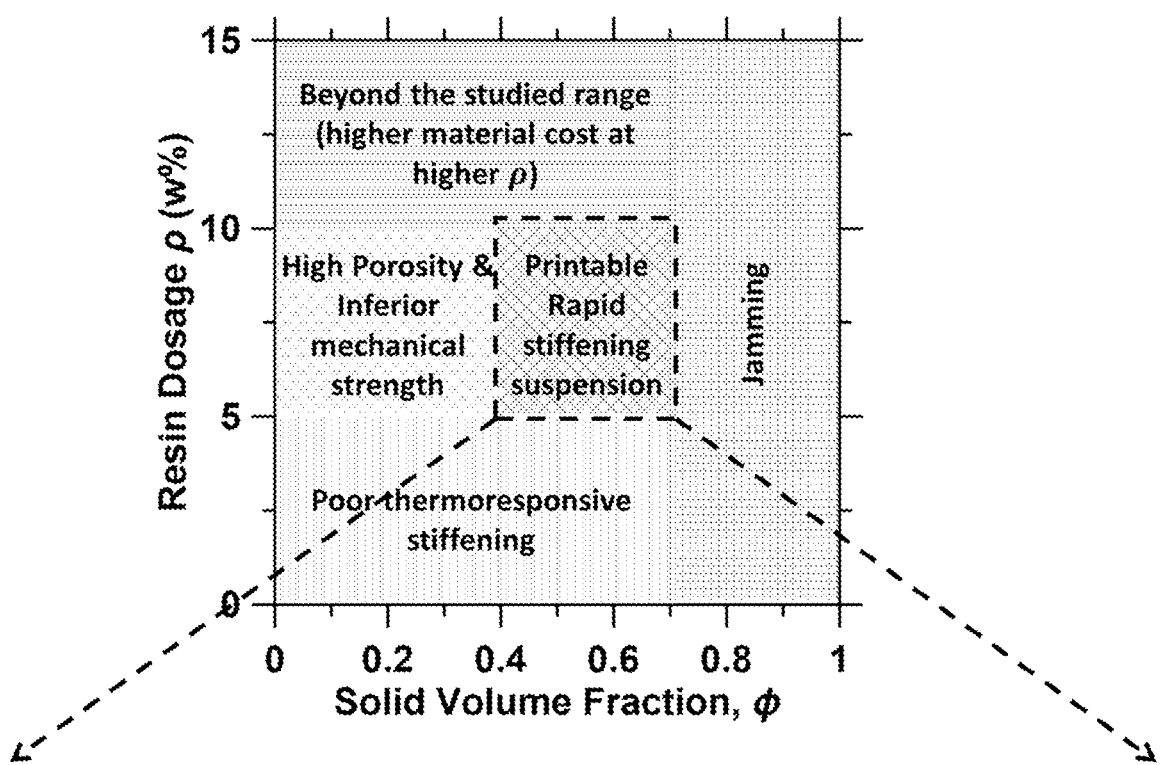
FIG. 8 shows a schematic of the interplay of the formulation parameters: solid volume fraction $\phi$, resin dosage $\rho$, thiol-to-epoxy mass ratio r, and initiator dosage x on the performance of thermoresponsive suspensions for 3D-printing applications (Note: the normalized mixing ratio is the ratio of thiol-to-epoxy mixing ratio r to the stochiometric thiol-to-epoxy mass ratio $r_{sto}$).
Figure 10A:
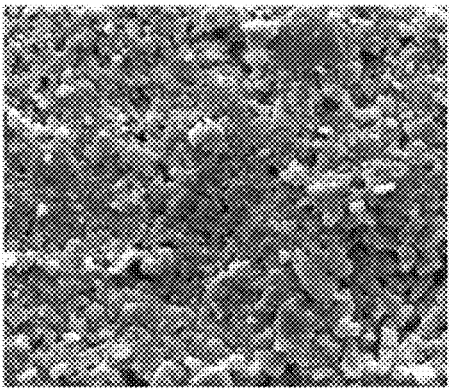
FIGS. 10A-10B show morphology and elemental mapping of cured epoxy-mineral composites comprising 40/60 quartz-calcite mixture ($\phi$=0.60) with different resin dosages, $\rho$=5, 7.5, and 10% by mass of mineral particulates (with thiol-epoxy mass ratio, r=1 and initiator dosage, x=5% by mass of resin).
Figure 10A:
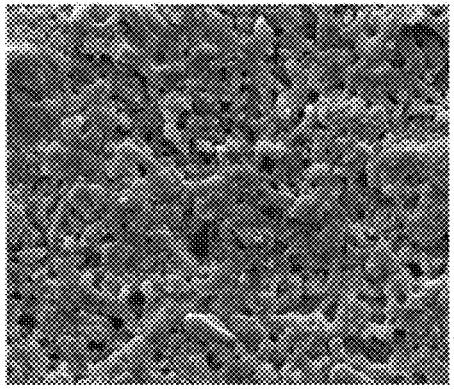
Figure 10A:
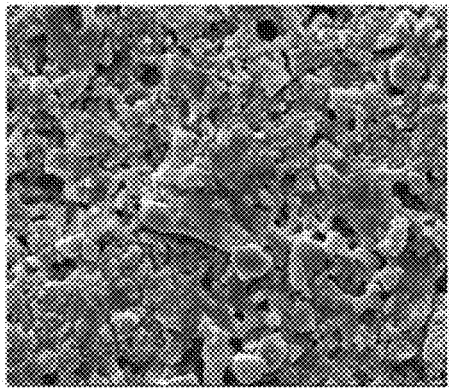
Figure 10B:
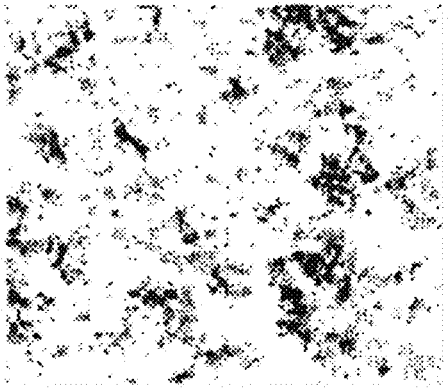
Figure 10B:
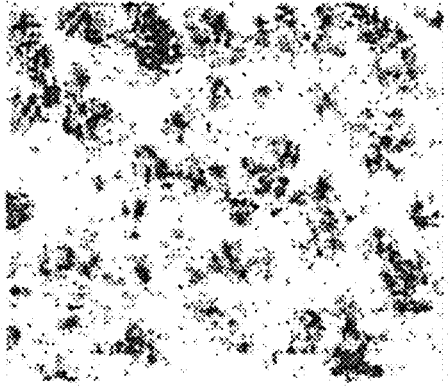
Figure 10B:
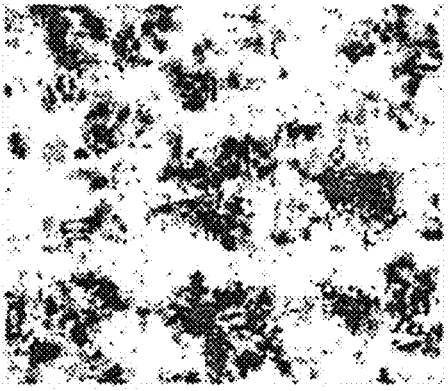

The interplay of the critical parameters on the design of thermoresponsive suspensions for 3D printing of structural elements is illustrated in FIG. 8. For the current formulation, we recommend a range of ϕ and ρ as a printable domain wherein the ϕ and ρ values are low enough to ensure that the suspensions' room temperature viscosity is sufficiently low for the ease of flow without jamming but high enough to provide MPa level flexural strength while minimizing porosity and drying shrinkage upon curing. Within the printable domain, the suspensions' stiffening rate (FIGS. 4B and 5A) and cured composites' flexural strength (FIG. 5A and FIGS. 6C-6D) are directly proportional to their ϕ and ρ. Formulations with higher ρ possess a denser crosslinked polymer network resulting in higher flexural strength (FIGS. 6C and 10B). Similarly, a higher ϕ produces denser composites with lower porosity and higher flexural strength (FIG. 6D).

However, the extrudability (i.e., ease of flow) of the suspensions decreases with increasing ϕ and the material cost increases with increasing ρ. Coupling of these considerations with the influence of r (FIGS. 5B-5C and FIGS. 6A-6B) and x (FIGS. 7A and 7B) can enable the precise formulation of 3-D printable mineral suspensions with thermally triggered curing that possess desired material properties, both pre- and post-extrusion.

Example 6: Anionic Homopolymerization of Epoxy Groups in Presence of 1-methylimidazole Initiator In thiol-epoxy mixture formulations with excess epoxy groups, upon exhaustion of thiol groups, MI-catalyzed anionic homopolymerization of epoxy groups takes place following Scheme 2.[26] The reaction mechanism involves initiation by nucleophilic attack of MI on the epoxy ring (reaction 1), followed by the propagation by the different alkoxide anions in the reaction mixture (reaction 2 & 3) and alkoxide-hydroxyl proton exchange (reaction 4). Two probable termination or regeneration mechanisms involve hydrogen abstraction (β-elimination) and the nucleophilic displacement of the MI (reaction 5 and 6).

Scheme 2: Proposed curing mechanism of MI catalyzed anionic homopolymerization of epoxy groups; (Note: R' and R": poly(alkylene oxide) moieties).

Initiation

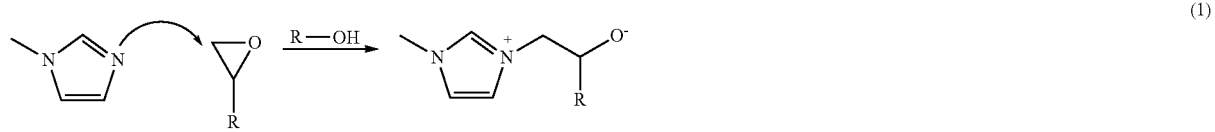

(1)

Propagation

(2)

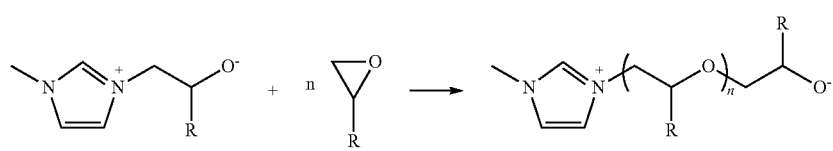

(3)

Chain-transfer

(4)

Termination/regeneration

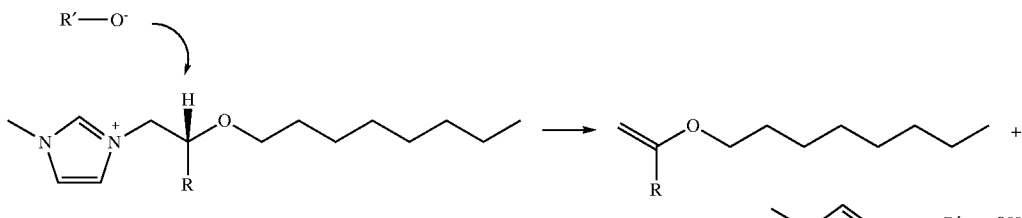
(5)

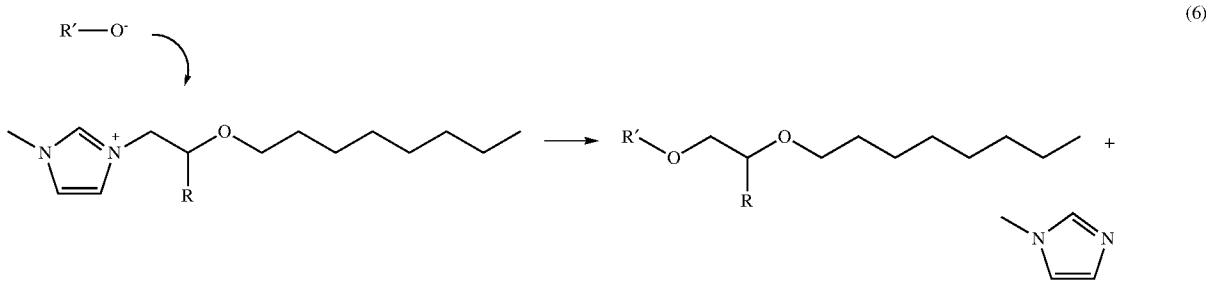
(6)

Example 7: Epoxy-Thiol Curing Kinetics (Estimation of Activation Energy

The model-free isoconversional methodology was used for the determination of the apparent activation energy $E_\alpha$ during the curing process.[29-30] The isoconversional methods estimate $E_\alpha$ as a function of the extent of cure conversion $\alpha$. If changes in the cure mechanism are associated with changes in the value of $E_\alpha$, they can be detected using isoconversional methods. The $E_\alpha$ vs $\alpha$ dependence may provide insights on changes in the reaction mechanism, if these changes are associated with changes in the activation energy.

The kinetics of curing reactions can be described by the following rate equation:

$$\frac{d\alpha}{dt} = k(T)f(\alpha) = A\exp\left(\frac{-E}{RT}\right)f(\alpha) \quad (1)$$

where t is the time, $\alpha$ is the extent of conversion, k(T) is the Arrhenius rate constant, A and E are the Arrhenius parameters (preexponential factor and activation energy, respectively), R is the gas constant, and $f(\alpha)$ is the reaction model associated with a certain reaction mechanism. The isoconversional principle states that the reaction rate at a constant extent of conversion is only a function of the temperature, and hence, $$\left[\frac{d\ln(d\alpha/dt)}{dT^{-1}}\right]_\alpha = -\frac{E}{R} \quad (2)$$

The isoconversional methods employ multiple temperature programs (e.g., different heating rates and/or temperatures), to obtain data on varying rates at a constant extent of conversion. An advanced integral isoconversional method developed by Vyazovkin was adopted in our work.[27,30] set of non-isothermal DSC curing data was collected at heating rates of 2.5, 5, 10, 15, and 20° C./min. According to this method, $E_\alpha$ is determined at any particular value of a by finding the value of $E_\alpha$ that minimizes the function:

$$\Phi(E_\alpha) = \sum_{k=1}^{n} \sum_{j\neq i}^{n} \frac{J[E_\alpha, T_i(t_\alpha)]}{J[E_\alpha, T_j(t_\alpha)]} \quad (3)$$

where $$J[E_\alpha, T_i(t_\alpha)] \equiv \int_{t_\alpha-\Delta\alpha}^{t_\alpha} \exp\left[\frac{-E_\alpha}{RT_i(t)}\right] dt \quad (4)$$

where the subscripts i and j represent the two experiments performed under different heating programs. For each given value of a in Equation (3), the $E_\alpha$ value is determined as a value that minimizes $\Phi(E_\alpha)$ and the temperature integral J(E, T) is evaluated numerically from the experimental data. The procedure is repeated for each value of $\alpha$ to find the dependence of the activation energy on the extent of conversion. The method was applied at regular conversion intervals of 0.01. FIG. 9 shows the variation in activation energy $E_\alpha$ for the epoxy-thiol mixtures and the quartz suspensions as a function of epoxy-thiol condensation cure conversion ($\alpha_{e-t}$, i.e., the fraction of the first stage curing reaction).

The value of $E_\alpha$ for the epoxy-thiol resin mixture (r=1, x=5%) decreased with an increase in epoxy-thiol condensation cure conversion $\alpha_{e-t}$ (i.e., the fraction of the first stage curing reaction). The higher initial $E_\alpha$ reflects the difficult and slow initiation leading to a longer induction period and a decrease in $E_\alpha$ with increasing cure conversion reflects the autocatalytic nature of the polymerization reaction (see FIG. 9).[31] The activation energy was <20 kJ/mol for $\alpha_{e-t}$>0.8, suggesting that the curing process became a diffusion-controlled process at higher $\alpha_{e-t}$ values.[29] The final increase in $E_\alpha$ is attributed to the exhaustion of thiol groups leading to a depletion of active species before the epoxy homopolymerization process is activated.[26]

Example 8: Thermo-Mechanical Responses of Epoxy-Mineral Suspensions

No significant differences in their surface morphologies were observed. Notably, the elemental mapping indicates that the thermosetting polymer is distributed across the composite matrix. Further insights are necessary to unequivocally conclude the evolution and distribution of the polymer network within the suspensions while curing. The increase in the flexural strength with increasing resin dosage observations can be rationalized qualitatively by the fact that a denser polymer network is formed within the composite matrix.

Figure 11:
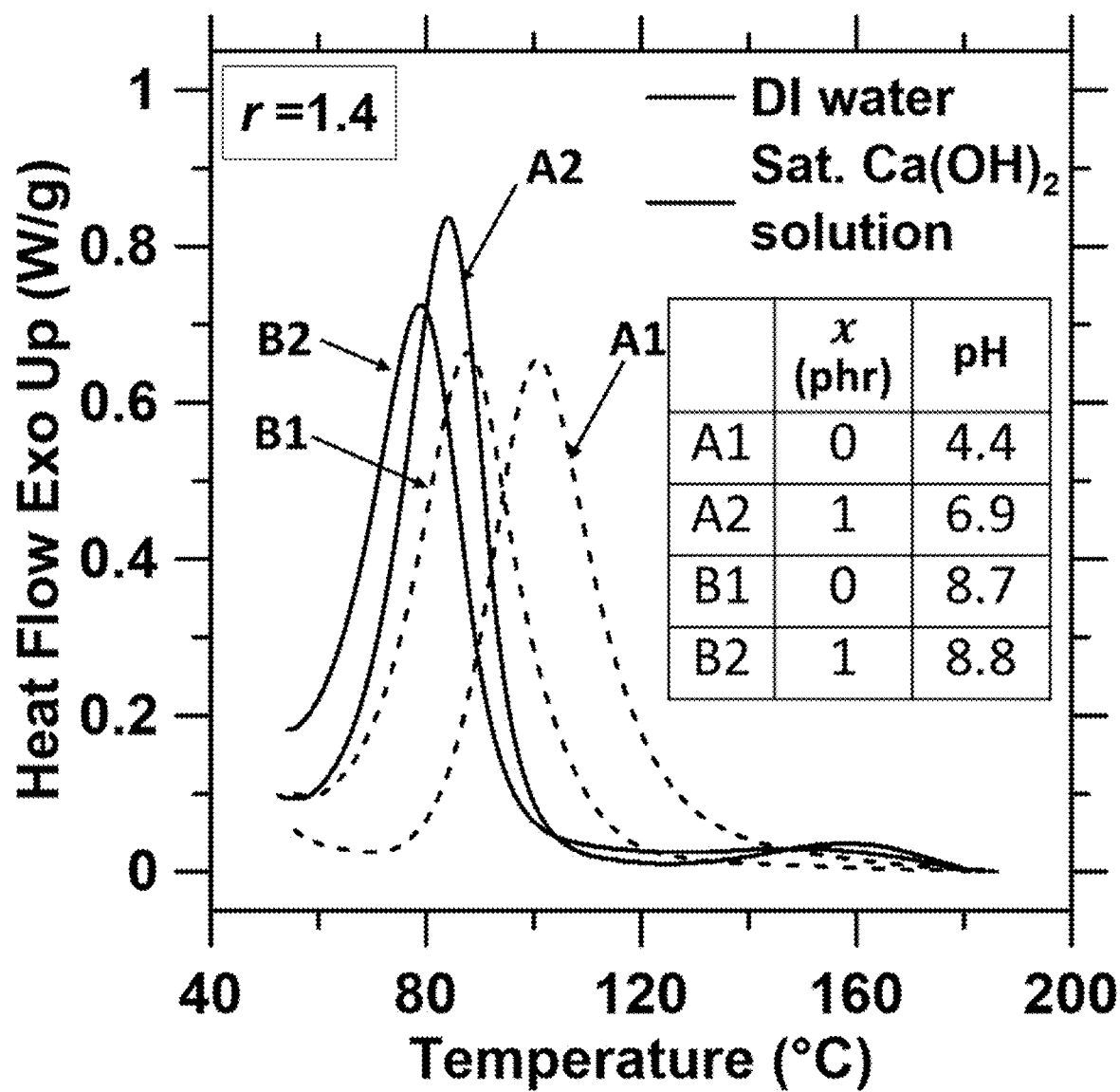
FIG. 11 shows DSC thermograms of epoxy-thiol monomers dispersed in aqueous media with differing pH.

Example 9: Effect of Alkalinity on Epoxy-Thiol Thermal Responsive Formulation Presence of [OH—] ions causes the deprotonation of thiol to produce thiolate anions (i.e., the nucleophile which attacks the epoxide ring). A higher rate of production of initial thiolate anions and the concomitant increase in the formation of alkoxide anions lead to a highly autocatalytic reaction. Epoxy-thiol polycondensation is pH sensitive and highly alkaline conditions can accelerate the curing kinetics. Alkalinity of the suspending medium results in reduced $T_{onset}$ and shortened induction period, i.e., compromised thermal latency (FIG. 11).

Figure 12A:
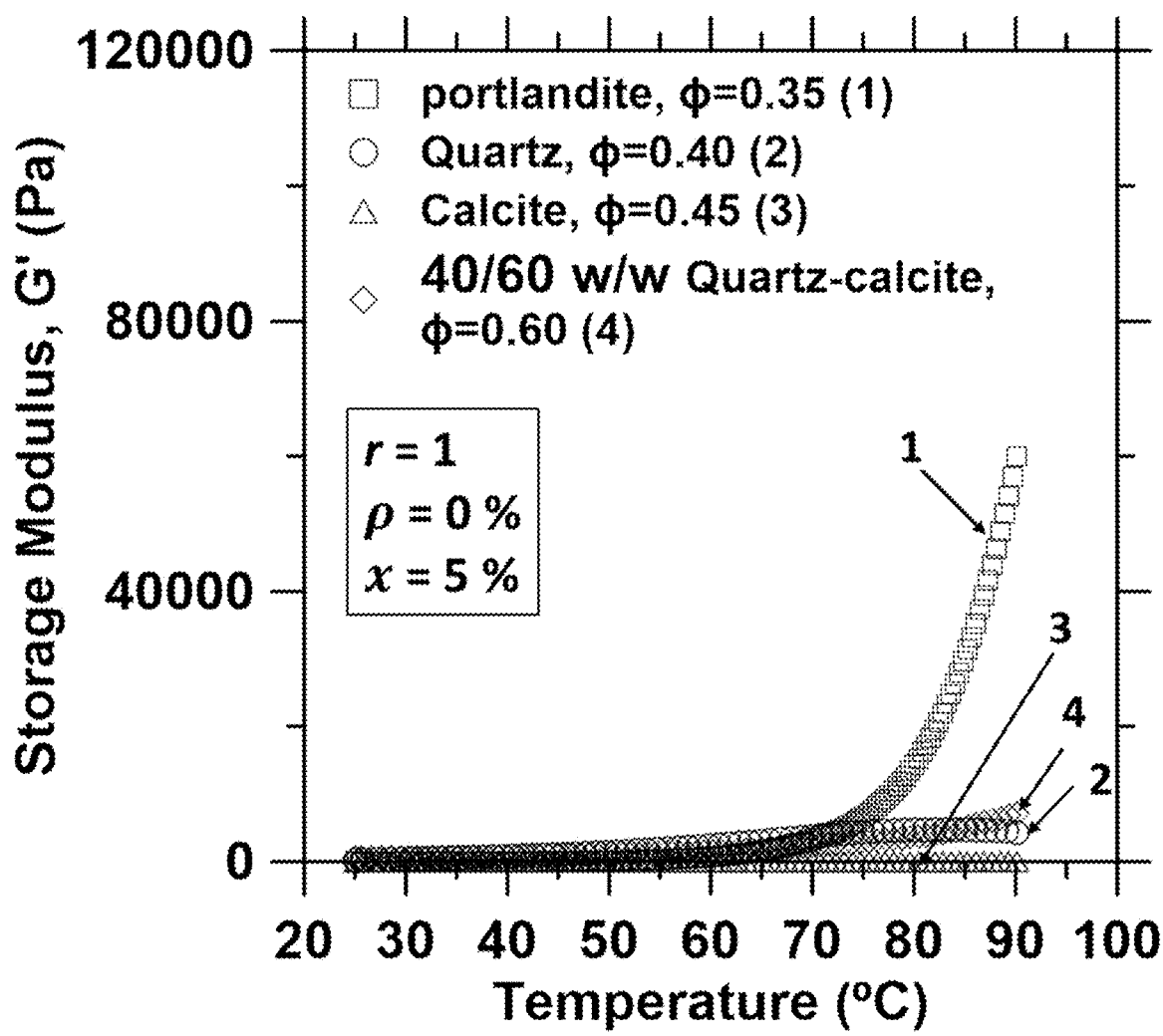
FIGS. 12A-12C show that portlandite suspensions exhibited a compromised thermal latency when compared to other mineral suspensions (quartz, calcite, and quartz-calcite mixture) due to high pH of the suspending medium.
Figure 12B:
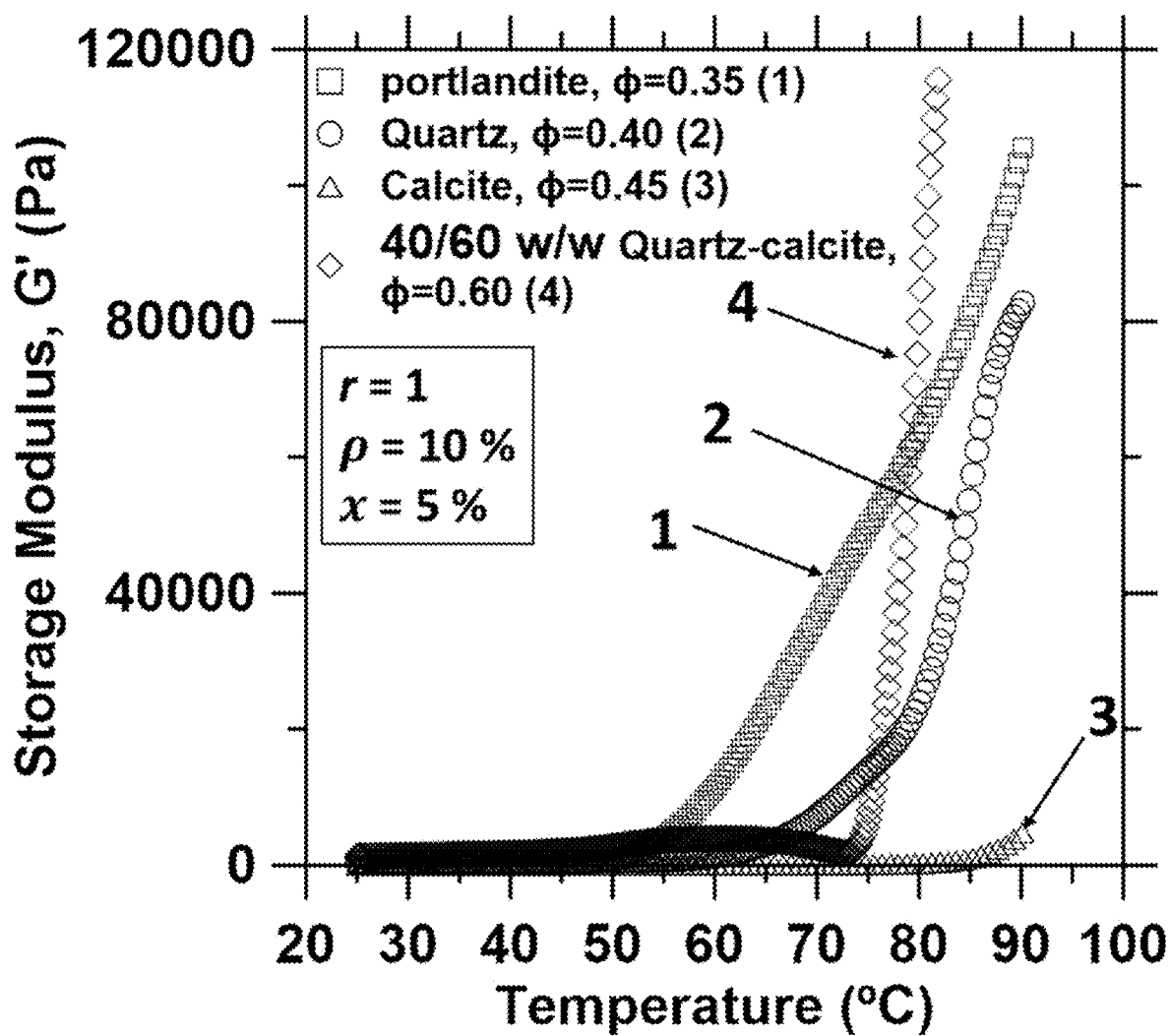
Figure 12C:
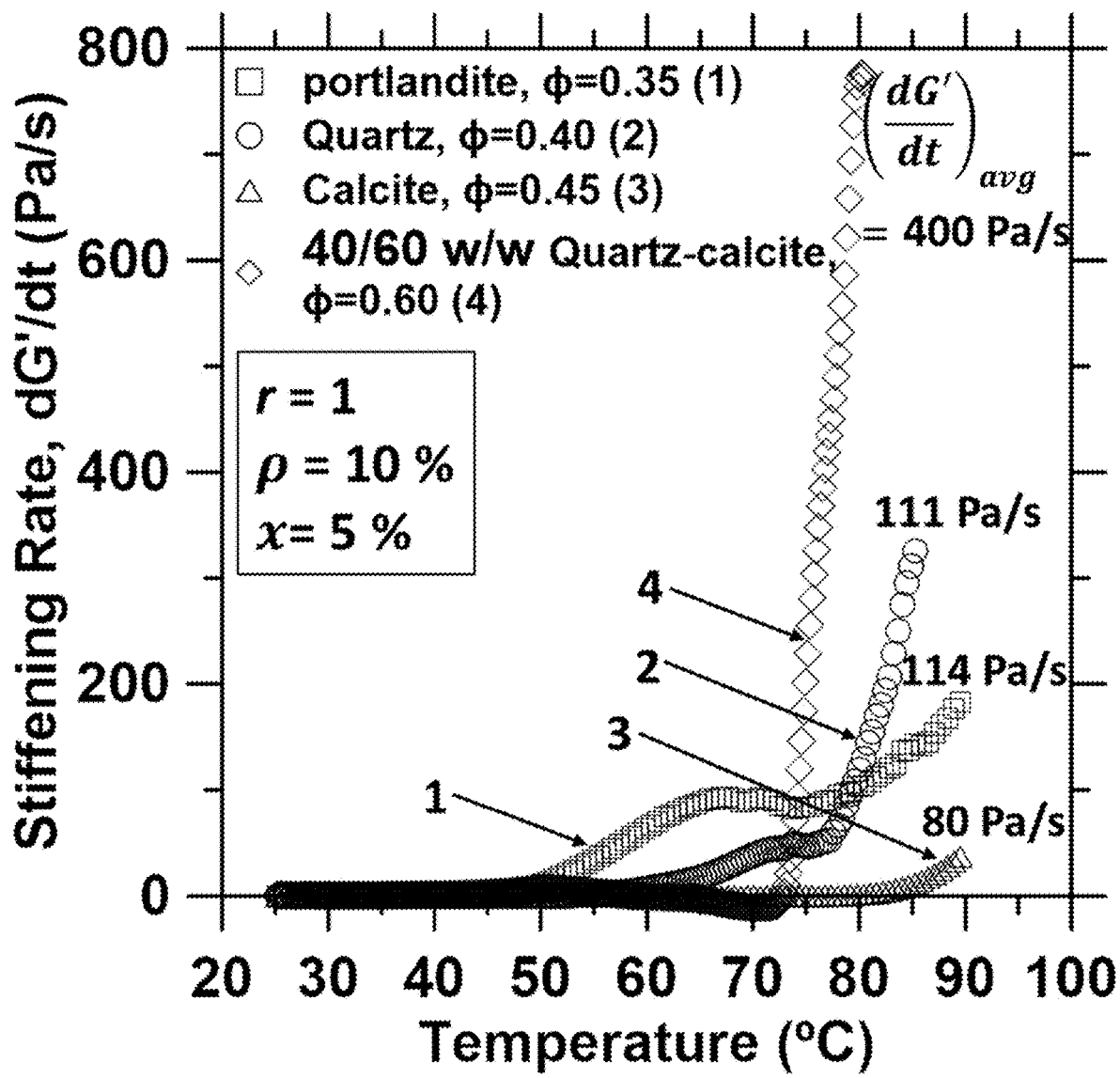

Alkalinity of the suspending medium can significantly accelerate the epoxy-thiol curing kinetics. Rapid dissolution of portlandite ($Ca(OH)_2$) results in a highly alkaline solution (pH~12.6, I~60 mM). Portlandite suspensions exhibited a compromised thermal latency: i.e., the lowest activation temperature and shortest induction period. Epoxy-thiol formulations can be adjusted to produce rapid, low temperature solidification irrespective of the formulation pH, however, the thermal latency is pH sensitive. (FIGS. 12A-12C).

Figure 13:
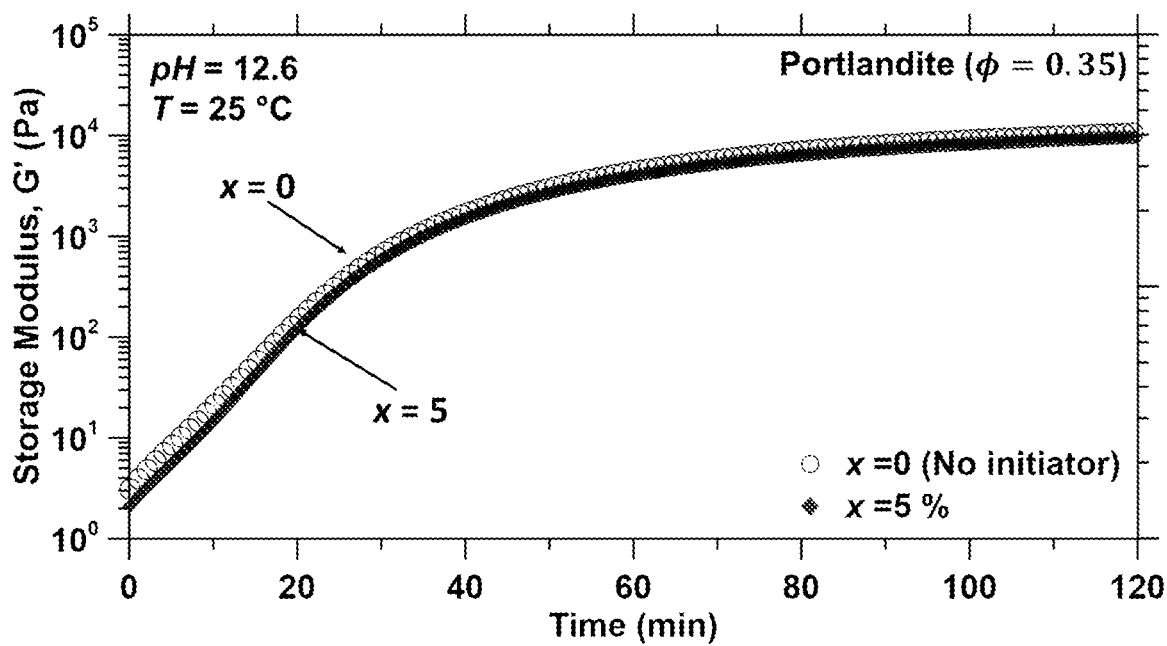
FIG. 13 shows SAOS results depicting the variation in G' at 25° C. with time for portlandite thermoresponsive suspensions (solid volume fraction, $\phi$=0.35) with different initiator dosages, x (with thiol-epoxy mass ratio, r=1) to illustrate their thermal latency. The curing reactions are auto triggered in portlandite suspensions leading to a short induction period, even in the absence of the initiator.

Suspensions with formulation pH~8 exhibit a thermal latency up to 70° C. and induction period up to 2 h at 25° C. (FIG. 7B). The hyper-alkalinity (pH>12) of the suspension causes a significant cure conversion at room temperature even in the absence of the initiator, resulting in an induction period ranging from 15 to 30 min. Portlandite suspensions exhibit a much faster evolution of G' at 25° C. when compared to that of the quartz suspensions (FIG. 7B and FIG. 13). Curing reactions are auto triggered in portlandite suspensions leading to a short induction period, even in the absence of the initiator. Both high initiator dosage and alkalinity adversely affect the thermal latency (FIG. 13).

While certain embodiments have been illustrated and described, it should be understood that changes and modifications can be made therein in accordance with ordinary skill in the art without departing from the technology in its broader aspects as defined in the following claims.

REFERENCES (1) Loureiro, R. M.; Amarelo, T. C.; Abuin, S. P.; Soulé, E. R.; Williams, R. J. J. Kinetics of the Epoxy-Thiol Click Reaction Initiated by a Tertiary Amine: calorimetric Study Using Monofunctional Components. *Thermochim. Acta* 2015, 616, 79-86. https://doi.org/10.1016/j.tca.2015.08.012.

(2) Stuparu, M. C.; Khan, A. Thiol-Epoxy "Click" Chemistry: Application in Preparation and Postpolymerization Modification of Polymers. *J. Polym. Sci. Part A Polym. Chem.* 2016, 54 (19), 3057-3070. https://doi.org/10.1002/pola.28195.

(3) Konuray, A. O.; Fernández-Francos, X.; Ramis, X. Analysis of the Reaction Mechanism of the Thiol-Epoxy Addition Initiated by Nucleophilic Tertiary Amines. *Polym. Chem.* 2017, 8 (38), 5934-5947. https://doi.org/10.1039/c7py01263b.

(4) Jin, K.; Heath, W. H.; Torkelson, J. M. Kinetics of Multifunctional Thiol-Epoxy Click Reactions Studied by Differential Scanning calorimetry: Effects of Catalysis and Functionality. *Polymer.* 2015, 81 (November), 70-78. https://doi.org/10.1016/j.polymer.2015.10.068.

(5) Vyazovkin, S.; Sbirrazzuoli, N. Isoconversional Kinetic Analysis of Thermally Stimulated Processes in Polymers. *Macromol. Rapid Commun.* 2006, 27 (18), 1515-1532. https://doi.org/10.1002/marc.200600404.

(6) Timoshenko, S. *Strength of Materials, Part II—Advanced Theory and Problems*; Huntington, N Y, 1958 (reprint 1976).

(7) Baratta, F. I.; Quinn, G. D.; Matthews, W. T. *Errors Associated with Flexure Testing of Brittle Materials;* 1987.

(8) Fernández-Francos, X.; Konuray, A. O.; Belmonte, A.; De La Flor, S.; Serra, À.; Ramis, X. Sequential Curing of Off-Stoichiometric Thiol-Epoxy Thermosets with a Custom-Tailored Structure. *Polym. Chem.* 2016, 7 (12), 2280-2290. https://doi.org/10.1039/c6py00099a.

(9) Guzmán, D.; Ramis, X.; Fernández-Francos, X.; Serra, A. New Catalysts for Diglycidyl Ether of Bisphenol A Curing Based on Thiol-Epoxy Click Reaction. *Eur. Polym. J.* 2014, 59, 377-386. https://doi.org/10.1016/j.eurpolymj.2014.08.001.

(10) Fernández-Francos, X.; Santiago, D.; Ferrando, F.; Ramis, X.; Salla, J. M.; Serra, À.; Sangermano, M. Network Structure and Thermomechanical Properties of Hybrid DGEBA Networks Cured with 1-Methylimidazole and Hyperbranched Poly(Ethyleneimine)S. *J. Polym. Sci. Part B Polym. Phys.* 2012, 50 (21), 1489-1503. https://doi.org/10.1002/polb.23145.

(11) Hoyle, C. E.; Lowe, A. B.; Bowman, C. N. Thiol-Click Chemistry: A Multifaceted Toolbox for Small Molecule and Polymer Synthesis. *Chem. Soc. Rev.* 2010, 39 (4), 1355-1387. https://doi.org/10.1039/b901979k.

(12) Carioscia, J. A.; Stansbury, J. W.; Bowman, C. N. Evaluation and Control of Thiol-Ene/Thiol-Epoxy Hybrid Networks. *Polymer.* 2007, 48 (6), 1526-1532. https://doi.org/10.1016/j.polymer.2007.01.044.

(13) Konuray, A. O.; Fernández-Francos, X.; Ramis, X. Latent Curing of Epoxy-Thiol Thermosets. *Polymer.* 2017, 116, 191-203. https://doi.org/10.1016/j.polymer.2017.03.064.

(14) Pascault, J.-P. *Thermosetting Polymers*; New York: Marcel Dekker, 2002.

(15) Isarn, I.; Massagués, L.; Ramis, X.; Serra, À.; Ferrando, F. New BN-Epoxy Composites Obtained by Thermal Latent Cationic Curing with Enhanced Thermal Conductivity. *Compos. Part A Appl. Sci. Manuf.* 2017, 103, 35-47. https://doi.org/10.1016/j.compositesa.2017.09.007.

(16) Rueb, C. J.; Zukoski, C. F. Viscoelastic Properties of Colloidal Gels. *J. Rheol.* 1997, 41 (2), 197-218. https://doi.org/10.1122/1.550812.

(17) Bhagavathi Kandy, S.; Mehdipour, I.; Neithalath, N.; Bauchy, M.; Garboczi, E.; Srivastava, S.; Gaedt, T.; Sant, G. Temperature-Induced Aggregation in Portlandite Suspensions. *Langmuir* 2020, 36 (36), 10811-10821. https://doi.org/10.1021/acs.langmuir.0c01798.

(18) Somasundaran, P.; Agar, G. E. The Zero Point of Charge of Calcite. *J. Colloid Interface Sci.* 1967, 24 (4), 433-440. https://doi.org/10.1016/0021-9797(67)90241-X.

(19) Flory, P. J. *Principles of Polymer Chemistry*; Cornell University Press, Ithaca, 1953.

(20) Hutchinson, J. M.; Moradi, S. Thermal Conductivity and Cure Kinetics of Epoxy-Boron Nitride Composites-A Review. *Materials (Basel).* 2020, 13, 3634.

(21) Ng, H.; Manas-zloczower, I. C. A. Filled Epoxy Resins. *Polym. Eng. Sci. Eng Sci.* 1993, 33 (4), 1-6.

(22) Becker, O.; Sopade, P.; Bourdonnay, R.; Halley, P. J.; Simon, G. P. Layered Silicate Nanocomposites Based on Various High-Functionality Epoxy Resins. Part II: The Influence of an Organoclay on the Rheological Behavior of Epoxy Prepolymers. *Polym. Eng. Sci.* 2003, 43 (10), 1683-1690. https://doi.org/10.1002/pen.10142.

(23) Isarn, I.; Bonnaud, L.; Massagués, L.; Serra, À.; Ferrando, F. Study of the Synergistic Effect of Boron Nitride and Carbon Nanotubes in the Improvement of Thermal Conductivity of Epoxy Composites. *Polym. Int.* 2020, 69 (3), 280-290. https://doi.org/10.1002/pi.5949.

(24) Hutchinson, J. M.; Roman, F.; Folch, A. Epoxy-Thiol Systems Filled with Boron Nitride for High Thermal Conductivity Applications. *Polymers.* 2018, 10 (3). https://doi.org/10.3390/polym10030340.

(25) Larson, R. G. *The Structure and Rheology of Complex Fluids*; Oxford University Press, 1999.

(26) Fernández-Francos, X.; Konuray, A. O.; Belmonte, A.; De La Flor, S.; Serra, À.; Ramis, X. Sequential Curing of Off-Stoichiometric Thiol-Epoxy Thermosets with a Custom-Tailored Structure. *Polym. Chem.* 2016, 7 (12), 2280-2290. https://doi.org/10.1039/c6py00099a.

(27) Vyazovkin, S. Modification of the Integral Isoconversional Method to Account for Variation in the Activation Energy. *J. Comput. Chem.* 2001, 22 (2), 178-183. https://doi.org/10.1002/1096-987x(20010130)22:2<178::aid-jcc5>3.0.co;2-%23.

(28) Vyazovkin, S. Evaluation of Activation Energy of Thermally Stimulated Solid-State Reactions under Arbitrary Variation of Temperature. *J. Comput. Chem.* 1997, 18 (3), 393-402. https://doi.org/10.1002/(SICI)1096-987X(199702)18:3<393::AID-JCC9>3.0.CO;2-P.

(29) Sbirrazzuoli, N.; Vyazovkin, S.; Mititelu, A.; Sladic, C.; Vincent, L. A Study of Epoxy-Amine Cure Kinetics by Combining Isoconversional Analysis with Temperature Modulated DSC and Dynamic Rheometry. *Macromol. Chem. Phys.* 2003, 204 (15), 1815-1821. https://doi.org/10.1002/macp.200350051.

(30) Vyazovkin, S.; Sbirrazzuoli, N. Isoconversional Kinetic Analysis of Thermally Stimulated Processes in Polymers. *Macromol. Rapid Commun.* 2006, 27 (18), 1515-1532. https://doi.org/10.1002/marc.200600404.

(31) Jin, K.; Heath, W. H.; Torkelson, J. M. Kinetics of Multifunctional Thiol-Epoxy Click Reactions Studied by Differential Scanning calorimetry: Effects of Catalysis and Functionality. *Polymer.* 2015, 81 (November), 70-78. https://doi.org/10.1016/j.polymer.2015.10.068.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A thermoresponsive suspension composition for use in additive manufacturing, the composition comprising an aqueous suspension of a thermosetting resin, a crosslinking agent configured to react with the thermosetting resin, and a mineral particulate, wherein the crosslinking agent comprises a thiol-terminated polymer having one or more thiol groups and the thermosetting resin and crosslinking agent react at or above a trigger temperature.

2. The thermoresponsive suspension composition of claim 1, wherein the mineral particulate is a mineral particulate common to cementitious compositions.

3. The thermoresponsive suspension composition claim 1, wherein the mineral particulate comprises quartz, calcite, portlandite, Portland cement, gypsum, calcium aluminate cement, calcium sulfoaluminate cement, fly ash, ground granulated blast furnace slag, calcined clay, limestone, recycled concrete, or a mixture of any two or more thereof.

4. The thermoresponsive suspension composition of claim 1, wherein the thermosetting resin comprises an epoxy resin, a polyisocyanate resin, an acrylic resin, or a mixture of any two or more thereof.

5. The thermoresponsive suspension composition of claim 1, wherein the thermosetting resin comprises an epoxy resin and the epoxy resin comprises at least two epoxy functional groups.

6. The thermoresponsive suspension composition of claim 1, wherein the thermosetting resin comprises from about 1% to about 50% by mass of the mineral particulate of the composition.

7. The thermoresponsive suspension composition of claim 1, wherein the crosslinking agent further comprises an amine-containing molecule, an alcohol-containing molecule, or a mixture of any two or more thereof.

8. The thermoresponsive suspension composition of claim 1, wherein a mass ratio of crosslinking agent to thermosetting resin is about 0.5 to 2.

9. The thermoresponsive suspension composition of claim 1, wherein the composition exhibits a solid mass fraction from 0.50 to 0.85.

10. The thermoresponsive suspension composition of claim 1, further comprising a dispersing agent.

11. The thermoresponsive suspension composition of claim 10, wherein the dispersing agent comprises a comb copolymer comprising a polyethylene glycol moiety and a charge bearing moiety, polysulfonate, or a mixture thereof.

12. The thermoresponsive suspension composition of claim 10, wherein the dispersing agent is present from about 0.1% to about 5% dry mass of dispersant by mass of the mineral particulate.

13. The thermoresponsive suspension composition of claim 1 further comprising a cross-linking initiator.

14. The thermoresponsive suspension composition of claim 13, wherein the cross-linking initiator is a nucleophilic initiator with low basicity.

15. The thermoresponsive suspension composition of claim 13, wherein the cross-linking initiator comprises 1-methylimidazole, benzyldimethylamine, or a mixture thereof.

16. The thermoresponsive suspension composition of claim 13, wherein the cross-linking initiator is present at about 0.5% to about 10% mass of initiator by dry mass of resin.

17. The thermoresponsive suspension composition of claim 1, wherein the trigger temperature of the thermoresponsive suspension composition is from about 30° C. to about 90° C.

18. The thermoresponsive suspension composition of claim 1, wherein at or above the trigger temperature, the thermoresponsive suspension composition exhibits stiffening rate of about 5 Pa/s to about 500 kPa/s, and/or wherein the thermoresponsive suspension composition exhibits a pH from about 4 to about 13.

19. The thermoresponsive suspension composition of claim 11, wherein the comb copolymer comprising a polyethylene glycol moiety and a charge bearing moiety is a polycarboxylate ether.

* * * * *